(12) United States Patent
Takahashi et al.

(10) Patent No.: US 11,133,762 B2
(45) Date of Patent: Sep. 28, 2021

(54) DRIVE SYSTEM, FLUID UTILIZATION APPARATUS, AND AIR CONDITIONER

(71) Applicant: Mitsubishi Electric Corporation, Tokyo (JP)

(72) Inventors: Kenji Takahashi, Tokyo (JP); Tsukasa Masumura, Tokyo (JP); Akihiro Tsumura, Tokyo (JP); Yasuhiko Wada, Tokyo (JP); Akane Hongyo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/960,113

(22) PCT Filed: Jan. 18, 2018

(86) PCT No.: PCT/JP2018/001458
§ 371 (c)(1),
(2) Date: Jul. 6, 2020

(87) PCT Pub. No.: WO2019/142301
PCT Pub. Date: Jul. 25, 2019

(65) Prior Publication Data
US 2021/0067066 A1    Mar. 4, 2021

(51) Int. Cl.
*H02P 5/46* (2006.01)
*H02P 5/50* (2016.01)
(Continued)

(52) U.S. Cl.
CPC ............ *H02P 5/50* (2013.01); *H02P 21/05* (2013.01); *H02P 21/18* (2016.02); *H02P 21/22* (2016.02)

(58) Field of Classification Search
CPC .. H02P 5/50; H02P 21/18; H02P 21/22; H02P 21/05
(Continued)

(56) References Cited

U.S. PATENT DOCUMENTS 9,634,591 B2 *   4/2017  Qian ..................... H02P 6/182
2015/0229245 A1   8/2015  Cho et al.
(Continued)

OTHER PUBLICATIONS

Yongjae Lee et al., "Analysis and Control of Mono Inverter Dual Parallel SPMSM Drive System". IEEE. 2014, pp. 4843-4849. (discussed on p. 2-3 of the specification).
(Continued)

*Primary Examiner* — Erick D Glass
(74) *Attorney, Agent, or Firm* — Posz Law Group, PLC

(57) ABSTRACT

A drive system includes a current detection unit that detects a current flowing to a main synchronous motor, and a current detection unit that detects a current flowing to a secondary synchronous motor. The drive system includes a magnetic pole position estimation unit that estimates the magnetic pole position of the rotor of the main synchronous motor, and a magnetic pole position estimation unit that estimates the magnetic pole position of the rotor of the secondary synchronous motor. The drive system includes a current control unit that outputs a voltage command, and a secondary torque current pulsating component extraction unit that extracts a pulsating component. The drive system includes a subtracter that determines an angle difference, and a magnetic flux current command determination unit that determines a magnetic flux current command.

15 Claims, 19 Drawing Sheets

(51) Int. Cl.
    *H02P 21/18*     (2016.01)
    *H02P 21/22*     (2016.01)
    *H02P 21/05*     (2006.01)

(58) Field of Classification Search
    USPC .......................................................... 318/77
    See application file for complete search history.

(56) References Cited

U.S. PATENT DOCUMENTS

| | | | |
|---|---|---|---|
| 2017/0179855 A1* | 6/2017 | Cho | H02P 5/48 |
| 2017/0257048 A1* | 9/2017 | Tang | H02P 21/22 |

OTHER PUBLICATIONS

Yongjae Lee et al., "Control Method for Mono Inverter Dual Parallel Surface-Mounted Permanent-Magnet Synchronous Machine Drive System". IEEE Transactions on Industrial Electronics, vol. 62, No. 10, Oct. 2015, pp. 6096-6107. (discussed on p. 2-3 of the specification).
International Search Report of the International Searching Authority dated Apr. 17, 2018 for the corresponding International application No. PCT/JP2018/001458 (and English translation).

\* cited by examiner

FIG.11

|  | | MAIN d-AXIS CURRENT | |
|---|---|---|---|
|  | | INCREASE | DECREASE |
| ANGLE DIFFERENCE SIGN | POSITIVE | SECONDARY TORQUE DECREASE FIG. 6 | SECONDARY TORQUE INCREASE FIG. 7 |
|  | NEGATIVE | SECONDARY TORQUE INCREASE FIG. 9 | SECONDARY TORQUE DECREASE FIG. 10 |

DRIVE SYSTEM, FLUID UTILIZATION APPARATUS, AND AIR CONDITIONER

CROSS REFERENCE TO RELATED APPLICATION

This application is a U.S. national stage application of PCT/JP2018/001458 filed on Jan. 18, 2018, the contents of which are incorporated herein by reference.

TECHNICAL FIELD

The present invention relates to a drive system that drives two synchronous motors connected in parallel to a single power inverter, a fluid utilization apparatus including the drive system, and an air conditioner including the fluid utilization apparatus.

BACKGROUND

A synchronous motor may fail to produce proper torque, and thus lose synchronism or stop its operation unless information on a rotor position that is a rotational position of a rotor is used to apply a proper voltage in accordance with the rotational position. In driving a plurality of synchronous motors, thus, the prior art have used the same number of power inverters as the number of synchronous motors to apply a voltage according to a rotational position of a rotor of each of the synchronous motors. Unfortunately, this configuration poses a problem of increased cost because the number of power inverters increases as the number of synchronous motors increases. In recent years, the sophistication of synchronous motor control technology have made attempts to drive two synchronous motors with a single power inverter.

According to a technique disclosed in Patent Literature 1, two synchronous motors, which are a main synchronous motor and a secondary synchronous motor, are connected to a single power inverter. A drive system controls those two synchronous motors, using rotation speeds of the two synchronous motors. For the technique described in Patent Literature 1, the drive system performs vector control on the main synchronous motor, and uses both a difference in rotation speed and a difference in rotation position between the two synchronous motors to determine a d-axis current command for the main synchronous motor, such that the drive of the secondary synchronous motor is stabilized. Vector control is a control method in which currents flowing through a synchronous motor are decomposed into a current component generating torque and a current component generating magnetic flux, and the current components are controlled independently.

PATENT LITERATURE

Patent Literature 1: US 2015/0,229,245 A

Non Patent Literature

Non Patent Literature 1: Yongjae Lee, Jung-Ik Ha, "Analysis and Control of Mono Inverter Dual Parallel SPMSM Drive System", 2014, IEEE Non Patent Literature 2: Yongjae Lee, Jung-Ik Ha, "Control Method for Mono Inverter Dual Parallel Surface-Mounted Permanent-Magnet Synchronous Machine Drive System", 2015, IEEE Patent Literature 1 teaches that the technique disclosed in Patent Literature 1 is applicable to position sensorless control that does not use sensors such as speed detection means and position detection means. Non Patent Literatures 1 and 2 present the results of verification tests of position sensorless control using the technique of Patent Literature 1. Typically, position sensorless control is problematic from the standpoint of operation stability in the low-speed range. Such a problem with position sensorless control is that the low-rpm range provides a decreased speed electromotive force of motors, and the influence of output voltage errors of the power inverter becomes relatively large. Since the operation stability at low speed is an issue even when a single synchronous motor is driven by a single power inverter, it is more difficult to provide the operation stability in the low-speed range when two synchronous motors are driven in parallel by a single power inverter. Unfortunately, Patent Literature 1, Non Patent Literature 1, and Non Patent Literature 2 do not specifically describe a drive method in the low-speed range.

SUMMARY

The present invention has been made in view of the above. It is an object of the present invention to provide a drive system that can prevent unstable rotation in the low-speed range even when two synchronous motors are driven in position sensorless control manner, using a single power inverter.

In order to solve the above-described problem and achieve the object, a drive system of the present invention comprises a power inverter to supply power to a first synchronous motor and a second synchronous motor connected in parallel to each other; a first current detector to detect a first current flowing to the first synchronous motor; and a second current detector to detect a second current flowing to the second synchronous motor. The drive system also comprises a first magnetic pole position estimation unit to estimate a first magnetic pole position of a rotor of the first synchronous motor, using a voltage command for driving the first synchronous motor and the first current, and a second magnetic pole position estimation unit to estimate a second magnetic pole position of a rotor of the second synchronous motor, using the voltage command and the second current. The drive system further comprises a control unit to output the voltage command, using a torque current command, a magnetic flux current command, the first current, and the first magnetic pole position, and a pulsating component extraction unit to extract at least one of a torque current pulsating component and an active power pulsating component, the torque current pulsating component being contained in a torque current flowing to the second synchronous motor, the active power pulsating component contained in active power consumed by the second synchronous motor. The drive system further comprises a first subtracter to determine an angle difference that is a difference between the magnetic pole positions of the rotors of the first synchronous motor and the second synchronous motor, using the first magnetic pole position and the second magnetic pole position, and a magnetic flux current command determination unit to determine the magnetic flux current command, using the pulsating component extracted by the pulsating component extraction unit and the angle difference.

The present invention has the advantage of preventing the unstable rotation in the low-speed range even when the two synchronous motors are driven in the position sensorless control manner, using the single power inverter.

BRIEF DESCRIPTION OF DRAWINGS

FIG. 11 is a diagram illustrating a main d-axis current, the sign of angle difference, and the states of torque of the secondary synchronous motor illustrated in FIGS. 6, 7, 9, and 10 in association with each other.

DETAILED DESCRIPTION

Hereinafter, a drive system, a fluid utilization apparatus, and an air conditioner according to embodiments of the present invention will be described in detail with reference to the drawings. The embodiments are not intended to limit the invention.

First Embodiment

Figure 1:
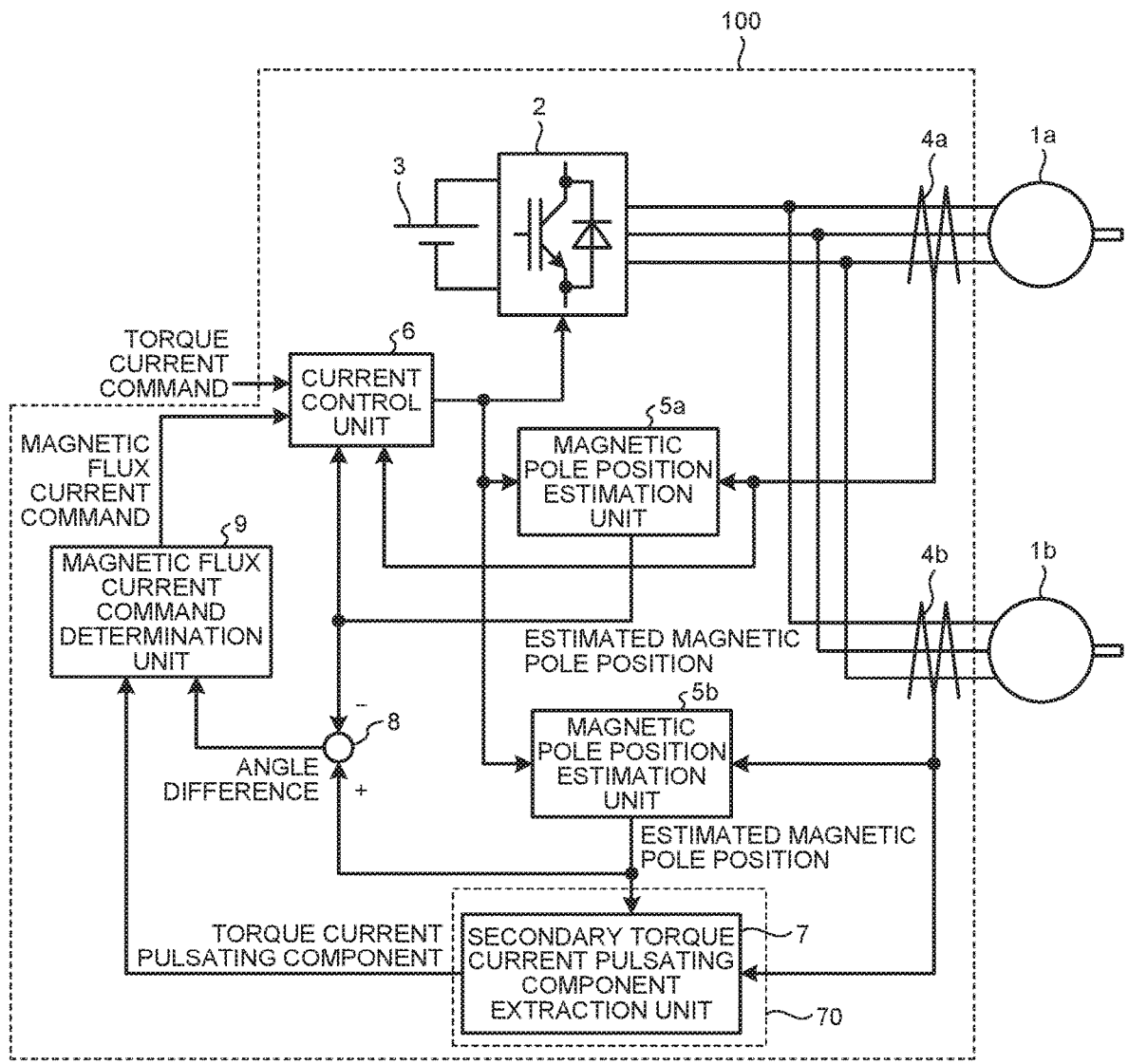
FIG. 1 is a diagram illustrating a configuration of a drive system according to a first embodiment of the present invention.

FIG. 1 is a diagram illustrating a configuration of a drive system according to a first embodiment of the present invention. Synchronous motors are broadly divided into permanent magnet field synchronous motors in which permanent magnets are provided to the rotor, winding field synchronous motors in which field windings are wound on the rotor, and reluctance synchronous motors that obtain running torque using the saliency of the rotor. Of these types of synchronous motors, synchronous motors of the same type, for example, two permanent magnet field synchronous motors are connected in parallel to a drive system 100 according to the first embodiment. In the first embodiment, one of the two synchronous motors is referred to as a main synchronous motor 1a, and the other is referred to as a secondary synchronous motor 1b. The main synchronous motor 1a is a first synchronous motor, and the secondary synchronous motor 1b is a second synchronous motor.

Although three-phase permanent magnet field synchronous motors are used in the first embodiment, it is only necessary that the two synchronous motors have nearly equal motor constants. Synchronous motors other than permanent magnet field ones may be used, or synchronous motors with phases other than three phases such as two phases or five phases may be used.

The drive system 100 includes a power inverter 2, a current detection unit 4a, a current detection unit 4b, and a magnetic pole position estimation unit 5a. The power inverter 2 supplies power to the main synchronous motor 1a and the secondary synchronous motor 1*b* connected in parallel to the main synchronous motor 1*a*. The current detection unit 4*a* detects a first current flowing to the main synchronous motor 1*a*. The current detection unit 4*b* detects a second current flowing to the secondary synchronous motor 1*b*. The magnetic pole position estimation unit 5*a* is a first magnetic pole position estimation unit. The drive system 100 further includes a magnetic pole position estimation unit 5*b*, a current control unit 6, a pulsating component extraction unit 70, a subtracter 8, and a magnetic flux current command determination unit 9. The magnetic pole position estimation unit 5*b* is a second magnetic pole position estimation unit. The current control unit 6 is a control unit for outputting a voltage command. The subtracter 8 is a first subtracter. The pulsating component extraction unit 70 includes a secondary torque current pulsating component extraction unit 7. In the following, the secondary torque current pulsating component extraction unit 7 is sometimes simply referred to as the "pulsating component extraction unit 7".

The power inverter 2 converts DC power supplied from a DC voltage source 3 into AC power, and outputs the AC power to the main synchronous motor 1*a* and the secondary synchronous motor 1*b*. In the first embodiment, a voltage source inverter is used as the power inverter 2. The voltage source inverter is a device that switches a DC voltage supplied from the DC voltage source 3, such that the DC voltage is converted into an AC voltage. The power inverter 2 is not limited to the voltage source inverter, and may be a circuit such as a current source inverter, a matrix converter that converts AC power into AC power different in amplitude and frequency, or a multi-level inverter in which the outputs of a plurality of inverters are connected in series or in parallel, as long as it can output AC power for driving the main synchronous motor 1*a* and the secondary synchronous motor 1*b*.

The current detection unit 4*a* that is a first current detector detects phase currents flowing from the power inverter 2 to the main synchronous motor 1*a*, and outputs current information indicating the values of the detected phase currents. The current detection unit 4*b* that is a second current detector detects phase currents flowing from the power inverter 2 to the secondary synchronous motor 1*b*, and outputs current information indicating the values of the detected phase currents.

The current detection units 4*a* and 4*b* may be current sensors using an instrument current transformer called a current transformer (CT), or current sensors using a shunt resistor. Alternatively, the current detection units 4*a* and 4*b* may be a combination of them. In the drive system 100 according to the first embodiment, currents are detected by the current detection units 4*a* and 4*b* provided near the synchronous motors. Although in the example illustrated in FIG. 1, phase currents flowing to the synchronous motors are directly detected, a current detection method is not limited to the example of direct detection. Any method may be used in which currents flowing to the synchronous motors can be calculated by Kirchhoff's current law. For example, a single-shunt current detection method using a shunt resistor provided in a negative DC bus of the power inverter 2, a lower-arm shunt current detection method using shunt resistors connected in series with lower arms of the power inverter 2, or the like may be used to detect phase currents flowing to the synchronous motors. For the three-phase power inverter 2, the lower-arm shunt current detection method uses shunt resistors connected in series with three lower arms, and thus is also called a three-shunt current detection method. However, in the single-shunt current detection method or the three-shunt current detection method, only the total value of currents flowing to the main synchronous motor 1*a* and the secondary synchronous motor 1*b* is measured. Thus, it is necessary to provide current sensors near one synchronous motor of the main synchronous motor 1*a* and the secondary synchronous motor 1*b*. Needless to say, for a three-phase synchronous motor, if current sensors are provided to wires of any two phases of wires of three phases connected to the synchronous motor, a current of the remaining one phase can be calculated by Kirchhoff's current law. Thus, it is not necessary to provide a current sensor to each of the wires of three phases. For the configuration and arrangement of the current detection unit 4*a* and the current detection unit 4*b*, various methods are possible. Basically, any method may be used.

Using the first current and a voltage command output, the magnetic pole position estimation unit 5*a* estimates a first magnetic pole position of the main synchronous motor 1*a*. The first current, which is detected by the current detection unit 4*a*, is the phase currents flowing to the main synchronous motor 1*a*. The voltage command is output from the current control unit 6.

Using the second current and the voltage command output, the magnetic pole position estimation unit 5*b* estimates a second magnetic pole position of the secondary synchronous motor 1*b*. The second current, which is detected by the current detection unit 4*b*, is the phase currents flowing to the secondary synchronous motor 1*b*. The voltage command is output from the current control unit 6.

There are various methods for estimating a magnetic pole position. In the middle- and high-speed range in the entire rotation speed range of the rotor of a synchronous motor, information indicating the speed electromotive force of the synchronous motor is commonly used to determine the magnetic pole position. The speed electromotive force, which is an induced power produced inside the synchronous motor by the rotation of the rotor, is proportional to a field produced between the rotor and the stator of the synchronous motor and the rotation speed of the rotor. Details of the methods of estimating the magnetic pole positions will be described later.

The current control unit 6 is a vector controller that controls a current flowing to the main synchronous motor 1*a*, by performing vector control for coordinate transformation of the current detected by the current detection unit 4*a* into a current command value in a d-q coordinate system where the d-axis is the direction of magnetic flux produced by the permanent magnets of the rotor of the main synchronous motor 1*a*, and the q-axis is an axis orthogonal to the d-axis. Common vector controllers control a current on d and q coordinates based on the magnetic poles of the rotor. This is because transformation of phase currents into values on d and q coordinates changes an AC amount into a DC amount, thereby facilitating the control. For a synchronous motor, a q-axis current is proportional to the magnet torque of the synchronous motor, and thus the q-axis is referred to as a torque axis, and the q-axis current is referred to as a torque current. In contrast to the q-axis current, a d-axis current, which causes a change in magnetic flux produced at the stator, changes the amplitude of the output voltage of the synchronous motor. For this reason, the d-axis is referred to as a magnetic flux axis, and the d-axis current is referred to as a magnetic flux current, an exciting current, or the like. Types of synchronous motors include surface magnet synchronous AC motors in which permanent magnets are provided on the outer peripheral surface of the rotor core, permanent magnet embedded motors in which permanent magnets are embedded inside the rotor core, etc. For a permanent magnet embedded motor, a d-axis current changes reluctance torque, and thus it is not only a q-axis current that acts on torque. Generally, however, the q-axis current is often referred to as a torque current.

The coordinate transformation uses an estimate value of the magnetic pole position calculated by the magnetic pole position estimation unit 5a. The current control unit 6 may use a polar coordinate system, not the d-q coordinate system in vector control. Such a polar coordinate system is, for example, an α-β stator coordinate system or a γ-δ coordinate system. Further, the current control unit 6 may employ direct torque control (DTC) instead of vector control. However, if DTC is employed, it is necessary to convert a current command into a magnetic flux command and a torque command.

The torque current and the magnetic flux current can be more precisely calculated by the control performed in a coordinate system based on magnetic flux produced from the stator rather than in the d-q coordinate system. This coordinate system, which is often referred to as, for example, an f-t coordinate system or an n-t coordinate system, is known and thus the details thereof will not be described. In the first embodiment, a q-axis current is sometimes referred to as a torque current and a d-axis current as a magnetic flux current, except where, for example, the control is performed using a coordinate system other than the d-q coordinate system, and reluctance synchronous motors that does not produce magnet torque in theory are used.

The current control unit 6 performs control such that a torque current flowing to the main synchronous motor 1a matches the value of a torque current command, and that a magnetic flux current flowing to the main synchronous motor 1a matches the value of a magnetic flux current command. The current control unit 6 may be actually implemented in any way. The current control unit 6 typically includes a proportional-integral controller and a decoupling controller. The torque current command may be calculated as a result of speed control in the magnetic flux current command determination unit 9, or may be input from a higher level controller. The details of the magnetic flux current command will be described later.

When the main synchronous motor 1a is vector-controlled by the current control unit 6, the secondary synchronous motor 1b is driven in an open loop as the secondary synchronous motor 1b is driven to rotate with the main synchronous motor 1a. Well-known literature regarding the open-loop drive of a synchronous motor is, for example, Reference 1 below.

(Reference 1) Junichi Ito, Jiro Toyosaki, Hiroshi Osawa, "High performance V/f control method for PM Motor", IEEJ Transactions on Industry Applications, Vol. 122 (2002) No. 3, p. 253-259

Reference 1 above describes that when a synchronous motor is driven in an open loop, the synchronous motor may be unstably controlled as the synchronous motor self-oscillates at a natural angular frequency $\omega_n$. The natural angular frequency $\omega_n$ is represented by an approximate expression in formula (1) below, where $P_m$ represents the number of pole pairs, (a represents the armature flux linkage, $L_a$ represents the armature inductance, and J represents the moment of inertia.

[Formula 1]

$$\omega_n \cong \frac{P_m \Phi_a}{\sqrt{JL_a}} \quad (1)$$

Electromechanical coupled oscillation is sometimes called electromechanical spring resonance. Thus, the natural angular frequency $\omega_n$ expressed by formula (1) above is also called an electromechanical spring resonance angular frequency. The technique disclosed in Reference 1 described above is additionally provided with a stabilizing compensator to suppress electromechanical spring resonance. The drive system 100 also requires similar stabilizing compensation. It is therefore necessary to check how much a torque current flowing to the secondary synchronous motor 1b illustrated in FIG. 1 oscillates due to the electromechanical spring resonance.

The technique disclosed in Patent Literature 1 determines a speed difference that is a difference between the rotation speeds of the rotors of the main synchronous motor and the secondary synchronous motor, and uses such a speed difference to thereby perform speed difference stabilizing compensation. Consequently, the main synchronous motor is controlled stably. Thus, it can be said that the technique disclosed in Patent Literature 1 performs stabilizing compensation by determining a speed pulsating component of the secondary synchronous motor. The details of differences between the technique disclosed in Patent Literature 1 and the first embodiment will be described later.

On the torque current flowing to the secondary synchronous motor 1b, a component due to acceleration/deceleration torque and a component due to load torque are superimposed. Acceleration/deceleration torque is inertial torque accompanying the acceleration/deceleration of a synchronous motor. Load torque is torque obtained by subtracting acceleration/deceleration torque and loss such as friction from output torque. The pulsating component extraction unit 7 illustrated in FIG. 1 extracts a pulsating component in the vicinity of the electromechanical spring resonance angular frequency, which component is contained in the torque current of the secondary synchronous motor 1b. The pulsating component extraction unit 7 employs two different types of methods: a method using a high-pass filter; and a method using a bandpass filter, which will be described in that order.

Figure 2:
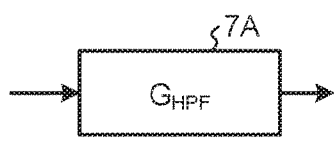
FIG. 2 is a diagram illustrating a first configuration example of a secondary torque current pulsating component extraction unit illustrated in FIG. 1.

FIG. 2 is a diagram illustrating a first configuration example of the secondary torque current pulsating component extraction unit illustrated in FIG. 1. FIG. 2 illustrates a configuration example of a secondary torque current pulsating component extraction unit 7A using a first-order high-pass filter. The secondary torque current pulsating component extraction unit 7A has its transfer function represented by formula (2) below, where s is the Laplace transform operator, and $\omega_c$ is the cutoff angular frequency.

[Formula 2]

$$G_{HPF} = \frac{s}{s + \omega_c} \quad (2)$$

Formula (2) above shows the transfer function when the first-order high-pass filter is used. If sharper filter characteristics are desired, a high-pass filter whose order is n may be used. n is an integer greater than or equal to two. When a high-pass filter is used, the cutoff angular frequency $\omega_c$ is preferably set to a value lower than or equal to ⅓ the electromechanical spring resonance angular frequency, for example, ⅕ to 1/20 the electromechanical spring resonance angular frequency.

Figure 3:
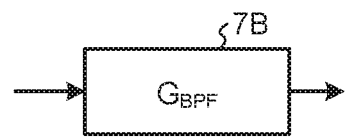
FIG. 3 is a diagram illustrating a second configuration example of the secondary torque current pulsating component extraction unit illustrated in FIG. 1.

FIG. 3 is a diagram illustrating a second configuration example of the secondary torque current pulsating component extraction unit illustrated in FIG. 1. FIG. 3 illustrates a configuration example of a secondary torque current pulsating component extraction unit 7B using a second-order bandpass filter. The a secondary torque current pulsating component extraction unit 7B has its transfer function represented by formula (3) below, where s represents the Laplace transform operator, and $\omega_p$ represents the peak angular frequency. q is a quality factor and is a coefficient that determines the passband width of the filter.

[Formula 3]

$$G_{BPF} = \frac{\frac{\omega_p}{q}s}{s^2 + \frac{\omega_p}{q}s + \omega_p^2} \quad (3)$$

Formula (3) above shows the transfer function when the second-order bandpass filter is used. If sharper filter characteristics are desired, a bandpass filter of order m may be used. m is an integer greater than or equal to three. When a bandpass filter is used, the secondary torque current pulsating component extraction unit 7B matches the peak angular frequency $\omega_p$ with the electromechanical spring resonance angular frequency. However, although not mentioned in Reference 1 described above, the electromechanical spring resonance angular frequency has a tendency to vary depending on drive conditions. Therefore, the passband width of the bandpass filter needs to be designed to be wider to allow for the variation of the electromechanical spring resonance angular frequency. The secondary torque current pulsating component extraction unit 7B may be configured to measure the electromechanical spring resonance angular frequency and make the peak angular frequency $\omega_p$ track the electromechanical spring resonance angular frequency. That is, the secondary torque current pulsating component extraction unit 7B may be configured to dynamically change the center frequency of the bandpass filter. In that case, the passband width can be narrowed. The center frequency corresponds to the peak angular frequency $\omega_p$.

Figure 4:
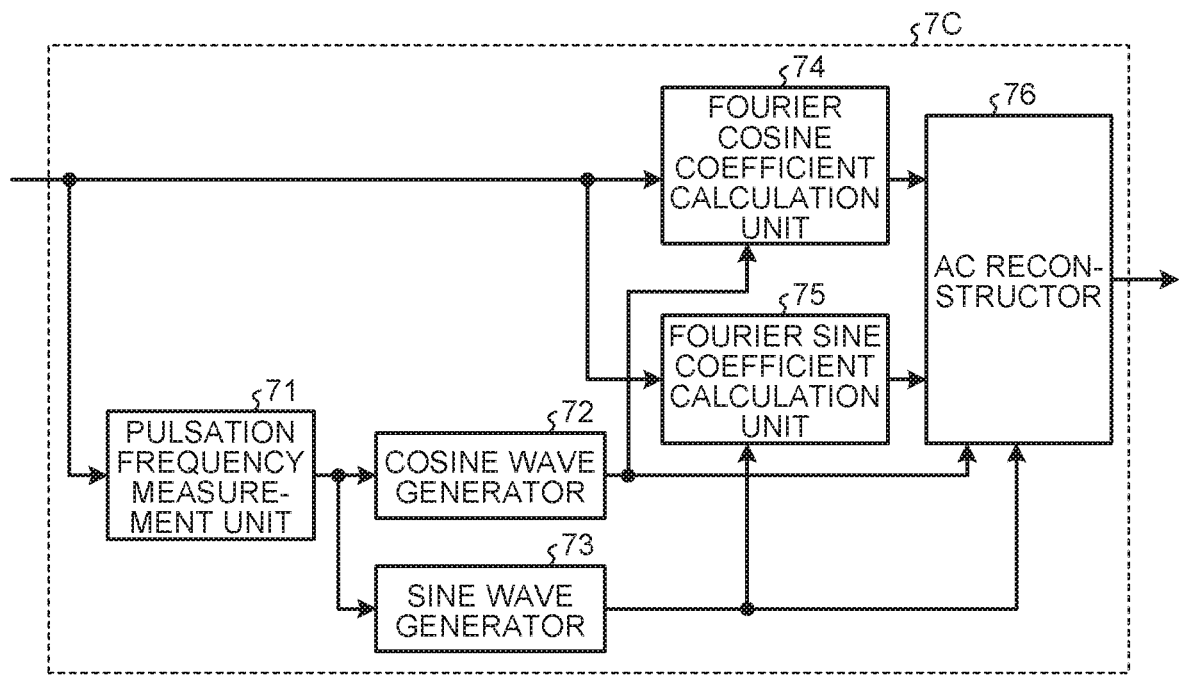
FIG. 4 is a diagram illustrating a third configuration example of the secondary torque current pulsating component extraction unit illustrated in FIG. 1.

Instead of performing the calculation of formula (3) above, a bandpass filter using Fourier series expansions may be used as illustrated in FIG. 4. FIG. 4 is a diagram illustrating a third configuration example of the secondary torque current pulsating component extraction unit illustrated in FIG. 1. A secondary torque current pulsating component extraction unit 7C illustrated in FIG. 4 includes a pulsation frequency measurement unit 71, a cosine wave generator 72, a sine wave generator 73, a Fourier cosine coefficient calculation unit 74, a Fourier sine coefficient calculation unit 75, and an AC reconstructor 76.

A pulsation frequency contained in an input signal that is the current detected by the current detection unit 4b, that is, a pulsation frequency contained in the current detected by the current detection unit 4b is measured by the pulsation frequency measurement unit 71. The secondary torque current pulsating component extraction unit 7 includes a coordinate transformer (not illustrated). The coordinate transformer of the secondary torque current pulsating component extraction unit 7 performs coordinate transformation, using the current detected by the current detection unit 4b and the magnetic pole position estimated by the magnetic pole position estimation unit 5b. Using the magnetic pole position estimated by the magnetic pole position estimation unit 5b, the coordinate transformer performs coordinate transformation of the current in the three-phase coordinate system detected by the current detection unit 4b, into a rotating rectangular coordinate system and outputs the converted current. The above-described input signal corresponds to the current whose coordinates have been transformed by the coordinate transformer. The cosine wave generator 72 generates a cosine wave signal that oscillates at the pulsation frequency, and the sine wave generator 73 generates a sine wave signal that oscillates at the pulsation frequency.

Using the cosine wave signal from the cosine wave generator 72, the Fourier cosine coefficient calculation unit 74 performs a Fourier series expansion of the input signal that is the current detected by the current detection unit 4b, such that the Fourier cosine coefficient calculation unit 74 calculates a Fourier cosine coefficient that is the magnitude of a cosine component of the magnitude of a specific frequency component contained in the input signal. The Fourier cosine coefficient is a coefficient when an even function having an arbitrary period is expanded in a cos series. Using the sine wave signal from the sine wave generator 73, the Fourier sine coefficient calculation unit 75 performs a Fourier series expansion of the input signal, such that the Fourier sine coefficient calculation unit 75 calculates a Fourier sine coefficient that is the magnitude of a sine component of the magnitude of the specific frequency component of the input signal. The Fourier sine coefficient is a coefficient when an odd function having an arbitrary period is expanded in a sin series.

The AC reconstructor 76 reconstructs an alternating current, using all of the cosine wave signal from the cosine wave generator 72, the sine wave signal from the sine wave generator 73, the Fourier cosine coefficient obtained by the Fourier series expansion, and the Fourier sine coefficient obtained by the Fourier series expansion. A Fourier series expansion is to extract the magnitude and phase of a specific frequency component from an input signal. The magnitude of the specific frequency component can be represented by the magnitude of a cosine component and the magnitude of a sine component. The phase can be represented by the ratio between the magnitude of the cosine component and the magnitude of the sine component. The secondary torque current pulsating component extraction unit 7C illustrated in FIG. 4 can provide the characteristics of a bandpass filter by Fourier series expansions and an inverse transform. In the inverse transform, an alternating current of a specific frequency is output on the basis of the magnitude of the cosine component, the magnitude of the sine component, and the phase of the specific frequency component extracted by the Fourier series expansions.

For a processor such as a microcomputer to implement the functions of the drive system 100, it is necessary to discretize the functions for implementation. When the bandpass filter in formula (3) above is discretized for use, changing the peak angular frequency $\omega_p$ causes variations in calculation accuracy. In particular, when the peak angular frequency $\omega_p$ is increased, the calculation accuracy tends to decrease. On the other hand, the Fourier series expansions can prevent a decrease in calculation accuracy even when they are discretized and the peak angular frequency $\omega_p$ is changed. Thus, the method of using Fourier series expansions to extract a pulsating component in the vicinity of the electromechanical spring resonance angular frequency contained in the torque current of the secondary synchronous motor 1b is excellent in terms of implementation. From this, the method of extracting a pulsating component, using Fourier series expansions is considered to be useful when the peak frequency of the bandpass filter is changed. A bandpass filter, which is a combination of the pulsation frequency measurement unit 71 illustrated in FIG. 4 and formula (3) above, may be used as the pulsating component extraction unit 7 illustrated in FIG. 1 provided that calculation accuracy can be guaranteed.

Thus, the pulsating component extraction unit 7 may be formed by any of the filters illustrated in FIGS. 2 to 4 as long as it can extract a pulsating component in the vicinity of the electromechanical spring resonance angular frequency contained in the torque current of the secondary synchronous motor 1b. A high-pass filter is easier to design and mount on a circuit than a bandpass filter. Thus, when importance is placed on simplicity in design and mounting on a circuit, a high-pass filter can be selected. When it is desired to obtain sharp cutoff characteristics, a bandpass filter can be selected.

The subtracter 8 illustrated in FIG. 1 determines an angle difference that is a difference between the magnetic pole position of the rotor of the main synchronous motor 1a and the magnetic pole position of the rotor of the secondary synchronous motor 1b. The magnetic pole positions are equal to the rotation positions or rotation angles of the rotors of the main synchronous motor 1a and the secondary synchronous motor 1b. In order to explain the reason for determining the angle difference, a voltage equation and a torque equation in a steady state of a permanent magnet synchronous motor are shown below.

The voltage equation is represented by formula (4) below. The torque equation is represented by formula (5) below. The first term on the right side of formula (5) below represents magnet torque, and the second term represents reluctance torque. The magnet torque is proportional to a q-axis current, and the reluctance torque is proportional to the product of a d-axis current and the q-axis current.

[Formula 4]

$$\begin{bmatrix} v_{dx} \\ v_{qx} \end{bmatrix} = \begin{bmatrix} R_{ax} & -\omega_{ex}L_{qx} \\ \omega_{ex}L_{dx} & R_{ax} \end{bmatrix} \begin{bmatrix} i_{dx} \\ i_{qx} \end{bmatrix} + \begin{bmatrix} 0 \\ \omega_{ex}\Phi_{ax} \end{bmatrix} \quad (4)$$

[Formula 5]

$$\tau_x = P_{mx}\Phi_{ax}i_{qx} + P_{mx}(L_{dx} - L_{qx})i_{dx}i_{qx} \quad (5)$$

In formulas (4) and (5) above, $R_a$ represents the armature resistance, $L_d$ represents the d-axis inductance, $L_q$ represents the q-axis inductance, $P_m$ represents the number of pole pairs, $\Phi_a$ represents the armature flux linkage, $\omega_e$ represents the angular velocity, $i_d$ represents the d-axis current, $i_q$ represents the q-axis current, $v_d$ represents a d-axis voltage, $v_q$ represents a q-axis voltage, and t represents produced torque. Subscripts "x" of these coefficients are for distinguishing whether the synchronous motor is the main one or the secondary one. For example, when it is not necessary to distinguish between the main one and the secondary one, "x" is added as the subscripts or the subscripts "x" are omitted. When "m" is added as the subscripts instead of "x", they indicate the main one, and when "$_s$" is added as the subscripts instead of "x", they indicate the secondary one.

Figure 5:
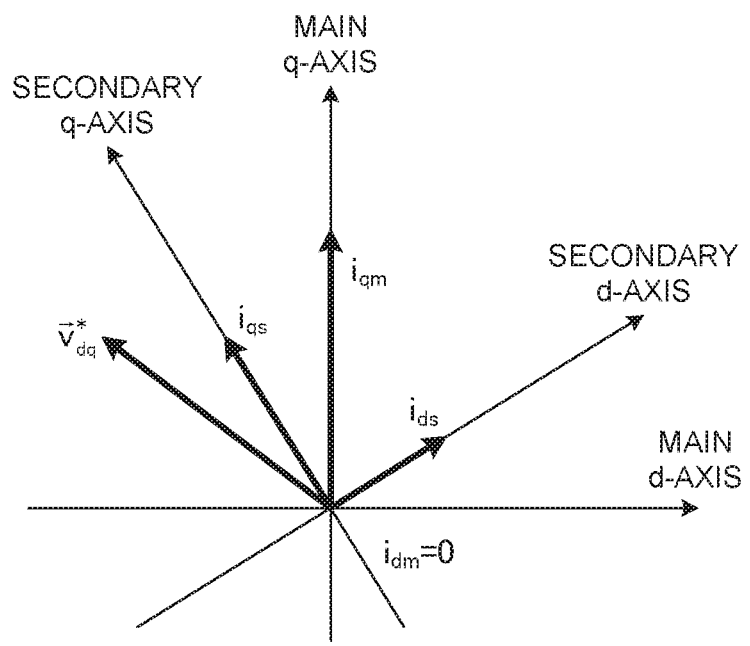
FIG. 5 is a first diagram for explaining the torque change behavior of a secondary synchronous motor illustrated in FIG. 1.
Figure 6:
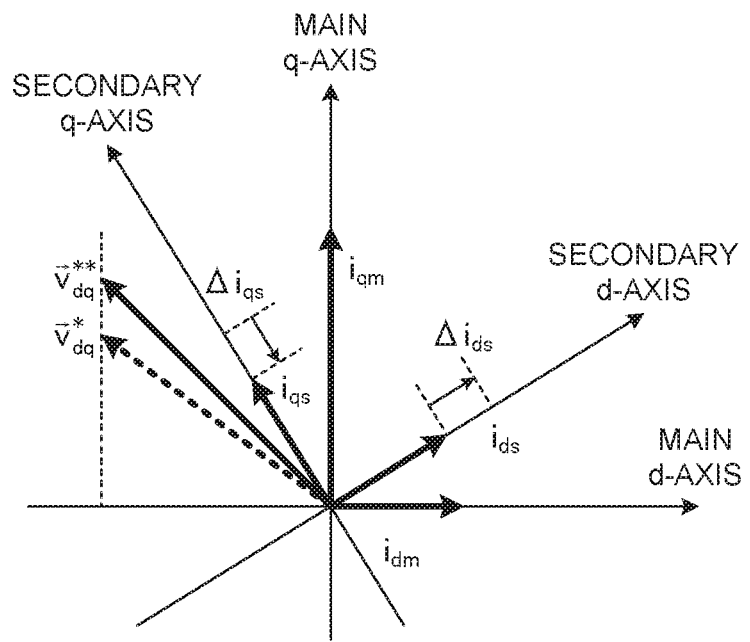
FIG. 6 is a second diagram for explaining the torque change behavior of the secondary synchronous motor illustrated in FIG. 1.
Figure 7:
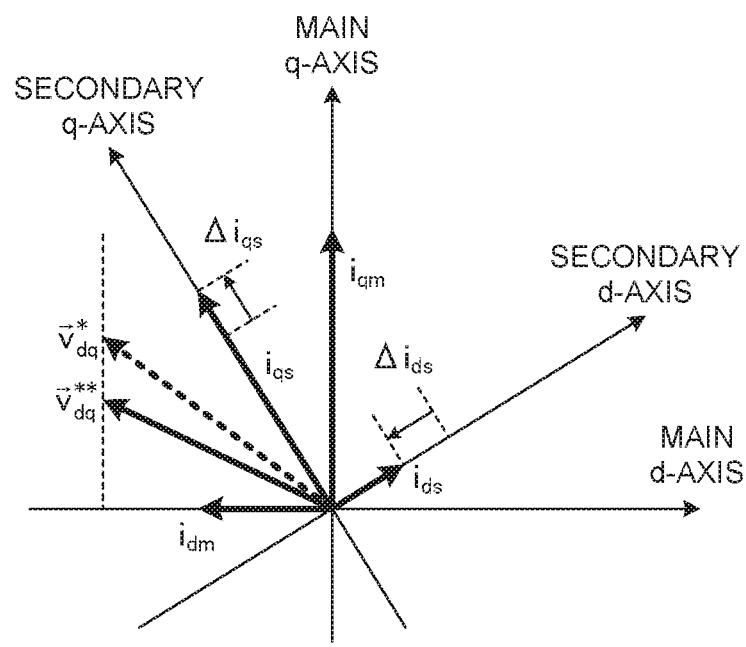
FIG. 7 is a third diagram for explaining the torque change behavior of the secondary synchronous motor illustrated in FIG. 1.
Figure 8:
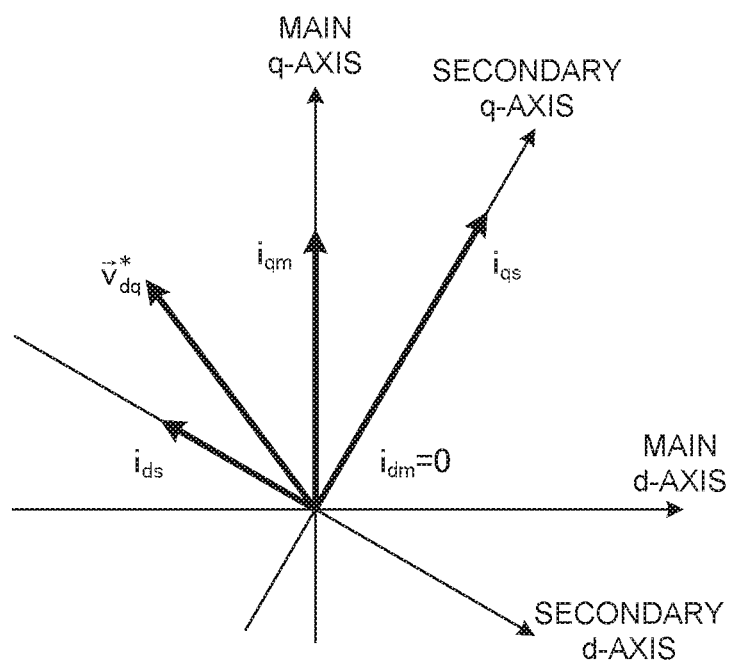
FIG. 8 is a fourth diagram for explaining the torque change behavior of the secondary synchronous motor illustrated in FIG. 1.
Figure 9:
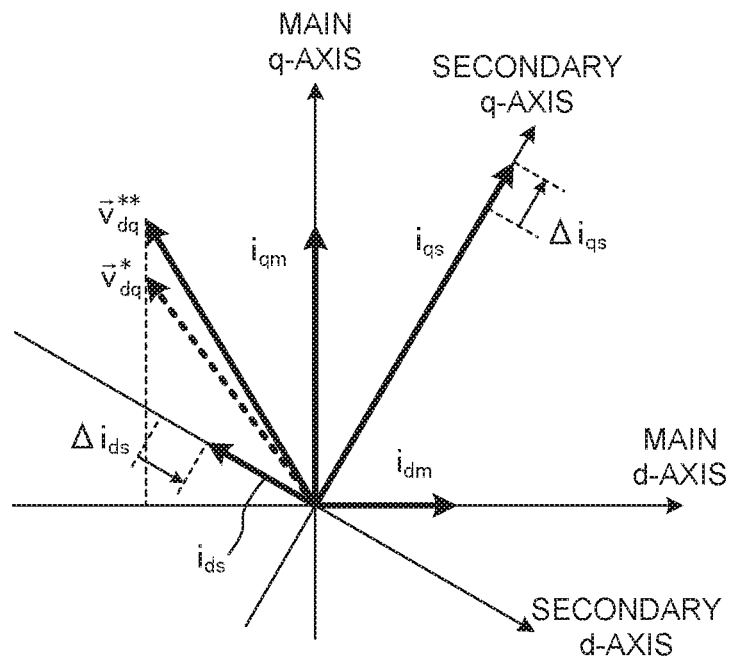
FIG. 9 is a fifth diagram for explaining the torque change behavior of the secondary synchronous motor illustrated in FIG. 1.
Figure 10:
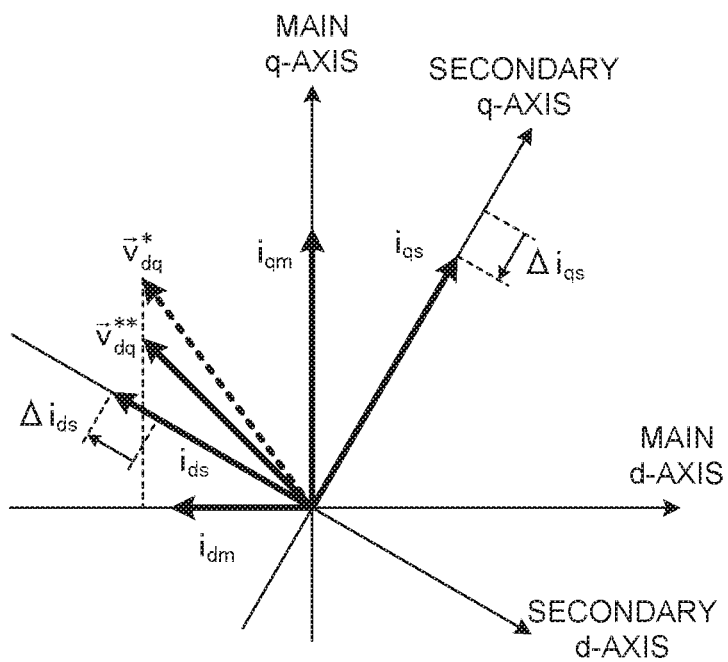
FIG. 10 is a sixth diagram for explaining the torque change behavior of the secondary synchronous motor illustrated in FIG. 1.

Next, with reference to FIGS. 5 to 11, the behavior of torque change of the secondary synchronous motor 1b due to magnetic flux current compensation will be described. FIG. 5 is a first diagram for explaining the behavior of torque change of the secondary synchronous motor illustrated in FIG. 1. FIG. 6 is a second diagram for explaining the behavior of torque change of the secondary synchronous motor illustrated in FIG. 1. FIG. 7 is a third diagram for explaining the behavior of torque change of the secondary synchronous motor illustrated in FIG. 1. FIG. 8 is a fourth diagram for explaining the behavior of torque change of the secondary synchronous motor illustrated in FIG. 1. FIG. 9 is a fifth diagram for explaining the behavior of torque change of the secondary synchronous motor illustrated in FIG. 1. FIG. 10 is a sixth diagram for explaining the behavior of torque change of the secondary synchronous motor illustrated in FIG. 1. FIG. 11 is a diagram illustrating a main d-axis current, the signs of the angle difference, and the torque states of the secondary synchronous motor illustrated in FIGS. 6, 7, 9 and 10 in association with each other.

FIGS. 5 to 10 illustrate the behavior of torque change of the secondary synchronous motor 1b due to the magnetic flux current compensation. What is discussed with reference to FIGS. 5 to 10 is disclosed in Patent Literature 1. The technique disclosed in Patent Literature 1 and the drive system 100 according to the first embodiment are the same in that the angle difference between the magnetic pole positions of the rotors of the main synchronous motor 1a and the secondary synchronous motor 1b is used in control for stabilizing the drive of the secondary synchronous motor 1b. However, the drive system 100 according to the first embodiment differs from the technique disclosed in Patent Literature 1 in that the drive system 100 according to the first embodiment does not use the speed difference between the main synchronous motor 1a and the secondary synchronous motor 1b.

First, with reference to FIG. 5, a case will be described in which the phase of the d-axis of the main synchronous motor 1a lags behind the phase of the d-axis of the secondary synchronous motor 1b. In FIG. 5, the magnetic flux current $i_{dm}$ of the main synchronous motor 1a is zero. If the torque current $i_{qm}$ of the main synchronous motor 1a flows in the positive direction, a voltage command vector $\vec{v}_{dq}{}^*$ is produced in a direction of the second quadrant. The voltage command vector $\vec{v}_{dq}{}^*$ represents a voltage command in the rotating rectangular coordinate system (d and q axes). When different load torques are produced in two synchronous motors whose motor constants are equal, the phase of a synchronous motor under a heavier load lags. Thus, in the case of FIG. 5, it can be said that the load on the main synchronous motor 1a is larger than the load on the secondary synchronous motor 1b. That is, the main synchronous motor 1a has a heavier load. When the drive system 100 applies the same voltage to the two synchronous motors, but the main synchronous motor 1a has a heavier load, the magnetic flux current of the secondary synchronous motor 1b flows in the positive direction. This is clear from solving formula (4) above.

Here, consider a case where a positive magnetic flux current flows to the main synchronous motor 1a as illustrated in FIG. 6. In this case, the q-axis voltage of the main synchronous motor 1a increases in the positive direction, so that the voltage command vector changes from $\vec{v}_{dq}{}^*$ to $\vec{v}_{dq}{}^{**}$. As the q-axis voltage of the main synchronous motor 1a changes like this, the d-axis voltage of the secondary synchronous motor 1b decreases, and the q-axis voltage of the secondary synchronous motor 1b increases. When the d-axis voltage of the secondary synchronous motor 1b decreases, $\omega_{es}L_{qs}i_{qs}$, which is the armature reaction of the q-axis of the secondary synchronous motor 1b, decreases. Consequently, the q-axis current of the secondary synchronous motor 1b decreases. Further, as the q-axis voltage of the secondary synchronous motor 1b increases, the d-axis current of the secondary synchronous motor 1b increases. Changing the d-axis current, i.e., the magnetic flux current $i_{dm}$ of the main synchronous motor 1a in the manner as discussed above changes the currents of the secondary synchronous motor 1b. Due to the changes in the currents of the secondary synchronous motor 1b, the torque of the secondary synchronous motor 1b changes as compared with the torque of the secondary synchronous motor 1b illustrated in FIG. 5. Here, for the sake of simplifying the explanation, assume that the synchronous motors are surface magnet synchronous AC motors having permanent magnets provided on the outer peripheral surface of the rotor core, and have no reluctance torque. In this case, the torque of the secondary synchronous motor 1b when the currents of the secondary synchronous motor 1b have changed decreases as compared with that in the state of FIG. 5.

FIG. 7 illustrates the torque state of the secondary synchronous motor 1b when a negative magnetic flux current flows to the main synchronous motor 1a, contrary to the case of FIG. 6. In this case, the q-axis voltage of the main synchronous motor 1a decreases, so that the voltage command vector changes from $\vec{v}_{dq}*$ to $\vec{v}_{dq}**$. Consequently, the d-axis voltage of the secondary synchronous motor 1b increases, and the q-axis voltage of the secondary synchronous motor 1b decreases. As the d-axis voltage of the secondary synchronous motor 1b increases, the q-axis current of the secondary synchronous motor 1b increases. As the q-axis voltage of the secondary synchronous motor 1b decreases, the d-axis current of the secondary synchronous motor 1b decreases. In this case, the torque of the secondary synchronous motor 1b increases as compared with that in the state of FIG. 5.

Next, with reference to FIG. 8, a case will be described in which the phase of the d-axis of the main synchronous motor 1a leads the phase of the d-axis of the secondary synchronous motor 1b. In FIG. 8, the d-axis current of the main synchronous motor 1a is zero, and the load on the main synchronous motor 1a is larger than the load on the secondary synchronous motor 1b, that is, the main synchronous motor 1a has a heavier load. Since the same voltage is applied to the main synchronous motor 1a and the secondary synchronous motor 1b, when the secondary synchronous motor 1b has a heavier load, the d-axis current of the secondary synchronous motor 1b flows in the negative direction.

Here, consider a case where a positive d-axis current flows to the main synchronous motor 1a as illustrated in FIG. 9. In this case, the q-axis voltage of the main synchronous motor 1a increases, so that the voltage command vector changes from $\vec{v}_{dq}*$ to $\vec{v}_{dq}**$. As the q-axis voltage of the main synchronous motor 1a changes like this, the d-axis voltage of the secondary synchronous motor 1b increases, and the q-axis voltage of the secondary synchronous motor 1b also increases. As the d-axis voltage of the secondary synchronous motor 1b increases, the q-axis current of the secondary synchronous motor 1b increases. Further, as the q-axis voltage of the secondary synchronous motor 1b increases, the d-axis current of the secondary synchronous motor 1b decreases. In this case, the torque of the secondary synchronous motor 1b increases as compared with that in the state of FIG. 8.

FIG. 10 illustrates the torque state of the secondary synchronous motor 1b when a negative magnetic flux current flows to the main synchronous motor 1a, contrary to the case of FIG. 9. In this case, the q-axis current of the secondary synchronous motor 1b decreases. Consequently, the torque of the secondary synchronous motor 1b decreases as compared with that in the state of FIG. 8.

FIG. 11 illustrates the main d-axis current, the signs of the angle difference, and the torque states of the secondary synchronous motor 1b illustrated in FIGS. 6, 7, 9 and 10 in association with each other. The angle difference λ between the two synchronous motors is defined as in formula (6) below. In this case, when the d-axis current of the main synchronous motor 1a is increased, the torque of the secondary synchronous motor 1b decreases if the angle difference λ, between the two synchronous motors is positive, and the torque of the secondary synchronous motor 1b increases if the angle difference λ is negative. It is noted that $\theta_{es}$ in formula (6) below represents the magnetic pole position of the secondary synchronous motor 1b as an electrical angle, and $\theta_{em}$ represents the magnetic pole position of the main synchronous motor 1a as an electrical angle. On the other hand, when the d-axis current of the main synchronous motor 1a is reduced, the torque of the secondary synchronous motor 1b increases if the angle difference λ between the two synchronous motors is positive, and the torque of the secondary synchronous motor 1b decreases if the angle difference λ is negative. That is, when the d-axis current of the main synchronous motor 1a is changed to thereby change the torque of the secondary synchronous motor 1b for the purpose of stabilizing the drive of the secondary synchronous motor 1b, it is necessary to determine the compensation direction of the d-axis current, depending on whether the angle difference λ between the two synchronous motors is positive or negative. For this reason, the subtracter 8 is used to determine the angle difference λ between the magnetic pole positions of the two synchronous motors.

[Formula 6]

$$\lambda = \theta_{es} - \theta_{em} \quad (6)$$

The magnetic flux current command determination unit 9 illustrated in FIG. 1 determines the magnetic flux current command for stabilizing the drive of the secondary synchronous motor 1b. As is described above, the magnetic flux current is changed to thereby change the torque of the secondary synchronous motor 1b. For the drive system 100, it is important how to determine the magnetic flux current command. Although Patent Literature 1 uses the speed difference between the two synchronous motors to determine the magnetic flux current, the drive system 100 according to the first embodiment determines the magnetic flux current from a pulsating component of the torque current of the secondary synchronous motor 1b. To explain the reason, it is necessary to describe a synchronous motor speed estimation method and speed estimate errors caused by magnetic flux current change.

As described above, various methods have been studied for estimating the magnetic pole position of a synchronous motor or for estimating the rotation speed of the rotor of a synchronous motor. In the middle- and high-speed range of the entire rotation speed range of the rotor of a synchronous motor, the magnetic pole position is typically determined using speed electromotive force information on the synchronous motor. A description is made herein as to two types of methods for determining the magnetic pole position, one of which is an arctangent method, the other being an adaptive flux observer.

An arctangent method, which is the most primitive position estimation method, is widely known. Formula (7) below is a voltage equation of a surface magnet synchronous AC motor on stator coordinates, where p is a differential operator, $\theta_e$ is the magnetic pole position (electrical angle), $R_a$ is the armature resistance, $L_a$ is the armature inductance, $v_\alpha$ and $v_\beta$ are voltages on the stator coordinates, $\Phi_a$ is the armature flux linkage, and $i_\alpha$ and $i_\beta$ are currents on the stator coordinates.

[Formula 7]

$$\begin{bmatrix} v_\alpha \\ v_\beta \end{bmatrix} = \begin{bmatrix} R_a + pL_a & 0 \\ 0 & R_a + pL_a \end{bmatrix} \begin{bmatrix} i_\alpha \\ i_\beta \end{bmatrix} + p\Phi_a \begin{bmatrix} \cos\theta_e \\ \sin\theta_e \end{bmatrix} \quad (7)$$

The second term on the right side of formula (7) above represents a speed electromotive force. The term of the speed electromotive force can be expressed as shown in formula (8) below, where $e_\alpha$ is an α-axis speed electromotive force, $e_\beta$ is a β-axis speed electromotive force, p is a differential operator, $\Phi_{\alpha r}$ is rotor a-axis magnetic flux, $\Phi_{\beta r}$ is rotor β-axis magnetic flux, $\Phi_a$ is the armature flux linkage, $\theta_e$ is the magnetic pole position (electrical angle), and $\omega_e$ is the angular velocity.

[Formula 8]

$$\begin{bmatrix} e_\alpha \\ e_\beta \end{bmatrix} = p\begin{bmatrix} \phi_{\alpha r} \\ \phi_{\beta r} \end{bmatrix} = p\Phi_a \begin{bmatrix} \cos\theta_e \\ \sin\theta_e \end{bmatrix} = \omega_e \Phi_a \begin{bmatrix} -\sin\theta_e \\ \cos\theta_e \end{bmatrix} \quad (8)$$

As can be seen from formula (7) above, the speed electromotive force includes $\theta_e$, which is magnetic pole position information. Thus, formula (7) above is rearranged to calculate the magnetic pole position. First, the rotor magnetic flux term is put on the left side, and the other terms are put together on the right side, to obtain formula (9) below. Since differential calculation amplifies noise, both of the sides are integrated to obtain formula (10) below. If a voltage sensor or the like has DC offset, using pure integration diverges the integral. Thus, when calculation of formula (10) below is performed, approximate integration is commonly used without integrating a DC component.

[Formula 9]

$$p\begin{bmatrix} \phi_{\alpha r} \\ \phi_{\beta r} \end{bmatrix} = \begin{bmatrix} v_\alpha \\ v_\beta \end{bmatrix} - R_a \begin{bmatrix} i_\alpha \\ i_\beta \end{bmatrix} - pL_a \begin{bmatrix} i_\alpha \\ i_\beta \end{bmatrix} \quad (9)$$

[Formula 10]

$$\begin{bmatrix} \hat{\phi}_{\alpha r} \\ \hat{\phi}_{\beta r} \end{bmatrix} = \begin{bmatrix} \int (v_\alpha - R_a i_\alpha) \cdot dt \\ \int (v_\beta - R_a i_\beta) \cdot dt \end{bmatrix} - L_a \begin{bmatrix} i_\alpha \\ i_\beta \end{bmatrix} \quad (10)$$

In formulas (9) and (10) above, the symbol "^" represents an estimate value. Formula (10) above is calculated to determine the rotor magnetic flux. An arctangent calculation is then performed on the determined rotor magnetic flux as shown in formula (11) below, thereby estimating the rotor magnetic pole position. Since the angular velocity can be calculated by using the estimated rotor magnetic pole position, an estimated angular velocity $\hat{\omega}_e$ is calculated by formula (12) below. When the estimated angular velocity $\hat{\omega}_e$ is used for control, it is usual to apply a low-pass filter to avoid the influence of differential noise. Alternatively, as shown in formula (13) below, the estimated angular velocity $\hat{\omega}_e$ can be calculated by estimating the speed electromotive force and dividing its amplitude by the armature flux linkage $\Phi_a$. However, since the magnetic flux of the permanent magnets vary due to temperature changes, the calculation method of formula (13) below causes steady speed estimate errors due to temperature changes. Therefore, errors caused by the speed estimation method by formula (12) below are fewer than errors caused by the method shown in formula (13) below. The first embodiment in which speed estimation by formula (12) below is performed is described.

[Formula 11]

$$\hat{\theta}_e = \tan^{-1}\left(\frac{\hat{\phi}_{\beta r}}{\hat{\phi}_{\alpha r}}\right) \quad (11)$$

[Formula 12]

$$\hat{\omega}_e = \frac{d}{dt}\hat{\theta}_e \quad (12)$$

[Formula 13]

$$\hat{\omega}_e = \frac{\sqrt{\hat{e}_\alpha^2 + \hat{e}_\beta^2}}{\Phi_a} \quad (13)$$

Figure 12:
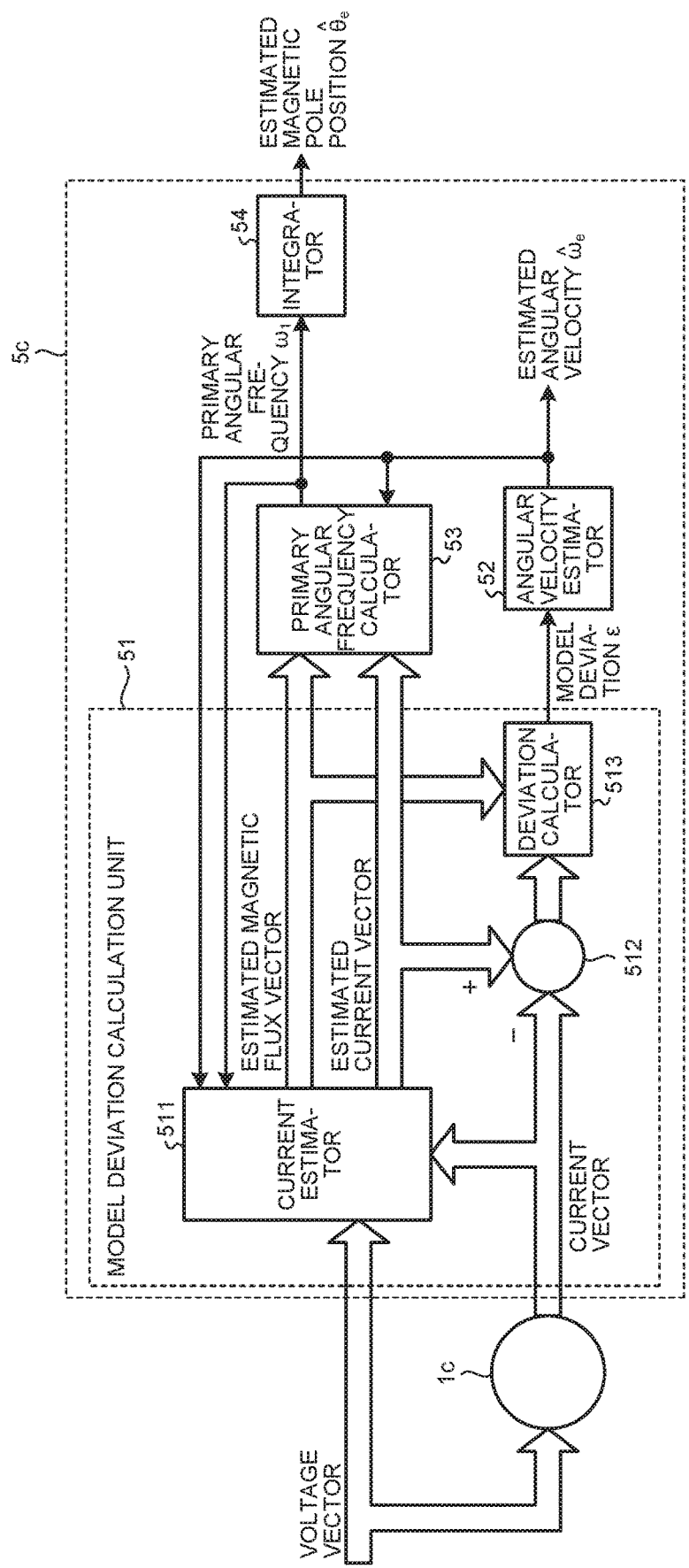
FIG. 12 is a diagram illustrating an example in which magnetic pole position estimation units illustrated in FIG. 1 are each formed by an adaptive flux observer.

Various speed estimation methods other than the arctangent method have been proposed. A description is made below with reference to FIG. 12 as to an adaptive flux observer that is a typical example of a speed estimation method other than the arctangent method. FIG. 12 is a diagram illustrating an example in which each magnetic pole position estimation unit illustrated in FIG. 1 is formed by an adaptive flux observer. A magnetic pole position estimation unit 5c illustrated in FIG. 12 is each of the magnetic pole position estimation units 5a and 5b illustrated in FIG. 1 formed by adaptive flux observers. A synchronous motor 1c illustrated in FIG. 12 corresponds to each of the main synchronous motor 1a and the secondary synchronous motor 1b illustrated in FIG. 1. The magnetic pole position estimation unit 5c, which employs an adaptive flux observer technique, estimates the rotation speed of the synchronous motor 1c, using a voltage vector and a current vector, such that the magnetic pole position estimation unit 5c outputs the estimated angular velocity $\hat{\omega}_e$ and the estimated magnetic pole position $\hat{\theta}_e$, the voltage vector being a voltage command generated by the current control unit 6 and input to the magnetic pole position estimation unit 5a or 5b, the current vector being current information generated by the current detection unit 4a or 4b, that is, d- and q-axis current detected values on the d and q coordinate axes.

The magnetic pole position estimation unit 5c includes a model deviation calculation unit 51 and an angular velocity estimator 52. The model deviation calculation unit 51 calculates a model deviation ε on the basis of the voltage vector and the current vector of the synchronous motor 1c, the primary angular frequency $\omega_1$ of the inverter, and the estimated angular velocity $\hat{\omega}_e$. The angular velocity estimator 52 calculates the estimated angular velocity $\hat{\omega}_e$ on the basis of the model deviation ε. The magnetic pole position estimation unit 5c further includes a primary angular frequency calculator 53 and an integrator 54. The primary angular frequency calculator 53 calculates the primary angular frequency $\omega_1$, using an estimated magnetic flux vector, an estimated current vector, and the estimated angular velocity $\hat{\omega}_e$. The integrator 54 integrates the primary angular frequency $\omega_1$ and outputs the estimated magnetic pole position $\hat{\theta}_e$.

The model deviation calculation unit 51 includes a current estimator 511 and a subtracter 512. The current estimator 511 calculates the estimated magnetic flux vector and the estimated current vector on the basis of the voltage vector and the current vector of the synchronous motor 1c, the primary angular frequency $\omega_1$, and the estimated angular velocity $\hat{\omega}_e$, and outputs the calculated vectors. The subtracter 512 calculates a current deviation vector by subtracting the current vector from the estimated current vector and outputs the current deviation vector. The model deviation calculation unit 51 further includes a deviation calculator 513. The deviation calculator 513 receives the current deviation vector from the subtracter 512, extracts an orthogonal component of the estimated magnetic flux vector as a scalar quantity, and outputs this value as the model deviation $\varepsilon$. The method of extracting the orthogonal component of the estimated magnetic flux vector as the scalar quantity is, for example, a method of performing coordinate transformation of the current deviation vector on rotating two axes, or a method of calculating the magnitude of the cross product of the current deviation vector and the estimated magnetic flux vector, and these methods are known.

The current estimator 511 estimates current and magnetic flux from a state equation of the synchronous motor 1c. Although the synchronous motor 1c discussed herein is a typical permanent magnet embedded synchronous AC motor, even in the case of a synchronous motor other than a permanent magnet embedded synchronous AC motor, the current estimator 511 can perform current estimation in a similar manner if a state equation can be formulated.

If the synchronous motor 1c is a permanent magnet embedded synchronous AC motor, the state equation is expressed as shown in formulas (14) and (15) below, where $L_d$ represents the d-axis inductance, $L_q$ represents the q-axis inductance, $R_a$ represents the armature resistance, and $\omega_1$ represents the primary angular frequency. $v_d$ represents the d-axis voltage, $v_q$ represents the q-axis voltage, $i_d$ represents the d-axis current, $i_q$ represents the q-axis current, $\varphi_{ds}$ represents d-axis stator magnetic flux, $\varphi_{qs}$ represents q-axis stator magnetic flux, $\varphi_{dr}$ represents d-axis rotor magnetic flux, $\omega_e$ represents the angular velocity, and $h_{11}$ to $h_{32}$ represent observer gains. The symbol "^" represents an estimate value.

[Formula 14]

$$\frac{d}{dt}\begin{bmatrix}\hat{\varphi}_{ds}\\\hat{\varphi}_{qs}\\\hat{\varphi}_{dr}\end{bmatrix} = \begin{pmatrix}\begin{bmatrix}-\frac{R_a}{L_d} & \omega_1 & 0\\ -\omega_1 & -\frac{R_a}{L_q} & -\hat{\omega}_e\\ 0 & 0 & 0\end{bmatrix}\begin{bmatrix}\hat{\varphi}_{ds}\\\hat{\varphi}_{qs}\\\hat{\varphi}_{dr}\end{bmatrix}+\begin{bmatrix}v_d\\v_q\\0\end{bmatrix}-\begin{bmatrix}h_{11} & h_{12}\\h_{21} & h_{22}\\h_{31} & h_{32}\end{bmatrix}\begin{bmatrix}\hat{i}_d-i_d\\\hat{i}_q-i_q\end{bmatrix}\end{pmatrix} \quad (14)$$

[Formula 15]

$$\begin{bmatrix}\hat{i}_d\\\hat{i}_q\end{bmatrix}=\begin{bmatrix}1/L_d & 0 & 0\\0 & 1/L_q & 0\end{bmatrix}\begin{bmatrix}\hat{\varphi}_{ds}\\\hat{\varphi}_{qs}\\\hat{\varphi}_{dr}\end{bmatrix} \quad (15)$$

The primary angular frequency $\omega_1$ is given as shown in formula (16) below, where $h_{41}$ and $h_{42}$ represent observer gains.

[Formula 16]

$$\omega_1 = \hat{\omega}_e - \frac{h_{41}(\hat{i}_d-i_d)+h_{42}(\hat{i}_q-i_q)}{\hat{\varphi}_{dr}} \quad (16)$$

Formulas (14) and (15) above are equations based on a normal induced voltage. Even if formulas (14) and (15) above are modified to be expressed in an extended induced voltage form, the same calculation can be performed. Formula (14) above includes the estimated angular velocity $\hat{\omega}_e$. Therefore, if the estimated angular velocity $\hat{\omega}_e$ does not match the actual angular velocity $\omega_e$, errors occur in current estimation. In this regard, the model deviation s is defined as shown in formula (17) below. The magnetic pole position estimation unit 5c adjusts the value of the estimated angular velocity $\hat{\omega}_e$, using the angular velocity estimator 52 so that the model deviation $\varepsilon$ becomes zero. The angular velocity estimator 52 is defined by, for example, an integrator and a proportional-integral controller connected in series with the integrator, which is publicly known.

[Formula 17]

$$\varepsilon = \frac{\hat{i}_q - i_q}{\hat{\varphi}_{dr}} \quad (17)$$

On the basis of formula (16) above, the primary angular frequency calculator 53 calculates the primary angular frequency $\omega_1$ from the estimated magnetic flux vector, the estimated current vector, and the estimated angular velocity $\hat{\omega}_e$. The integrator 54 estimates the magnetic pole position by integrating the primary angular frequency $\omega_1$.

The adaptive flux observer is robust relative to variations in flux linkage, and is excellent because steady speed estimate errors do not occur. Thus, the adaptive flux observer is widely recognized as a high-performance speed estimation method.

Now that the configuration example of the magnetic pole position estimation units 5a and 5b has been described in detail, next, the influence of changes in magnetic flux current on speed estimate errors will be described. Two types of analysis results produced in the absence of output voltage errors of the power inverter 2 and in the presence of the output voltage errors of the power inverter 2 will be described in order to clarify a problem. The problem means that when the accuracy of compensation for output voltage errors of the power inverter 2 decreases in the low-rpm range, the speed electromotive force of the motor decreases in the low-rpm range, and the influence of the output voltage errors of the power inverter 2 relatively increases. That is, the problem is that use of only the method of Patent Literature 1 in the presence of the output voltage errors would result in destabilization of control in the low-rpm range. An output voltage error means an error between the value of the voltage command given by the current control unit 6 to the power inverter 2 and an actual voltage actually output by the power inverter 2. Known factors in output voltage errors are, for example, a time during which to prevent short-circuiting of semiconductor devices of series-connected upper and lower arms of the power inverter 2, and an ON voltage of the semiconductor devices. Although many power inverters for driving motors on the market are provided with an output voltage error compensation function, it is difficult to compensate for output voltage errors when current flowing to those power inverter is close to zero. Therefore, relatively low-priced power inverters for driving motors usually cause some output voltage errors.

Figure 13:
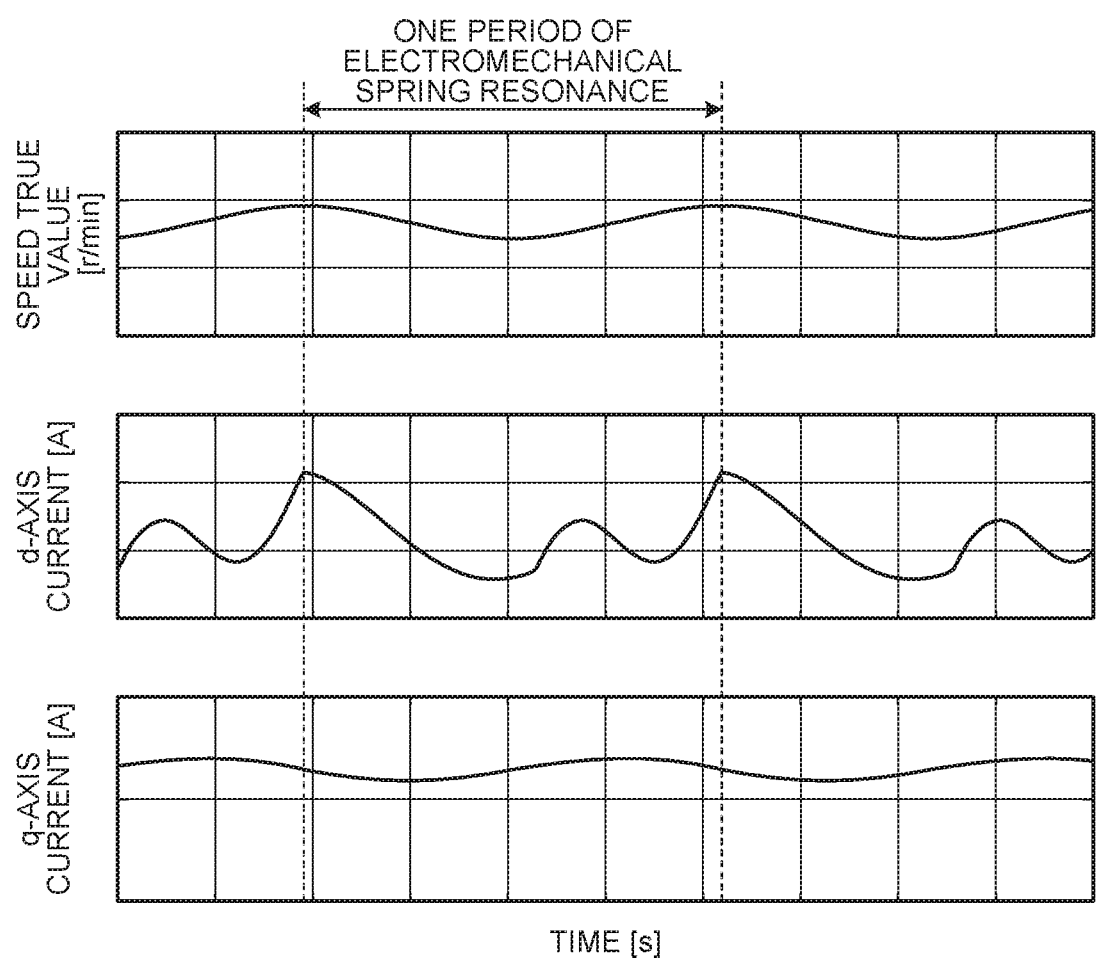
FIG. 13 is a diagram illustrating a speed true value that is the true value of the rotation speed, a d-axis current, and a q-axis current of the secondary synchronous motor when two synchronous motors are driven in parallel at low speed on the assumption that output voltage errors of a power inverter are zero, in the drive system according to the first embodiment.
Figure 14:
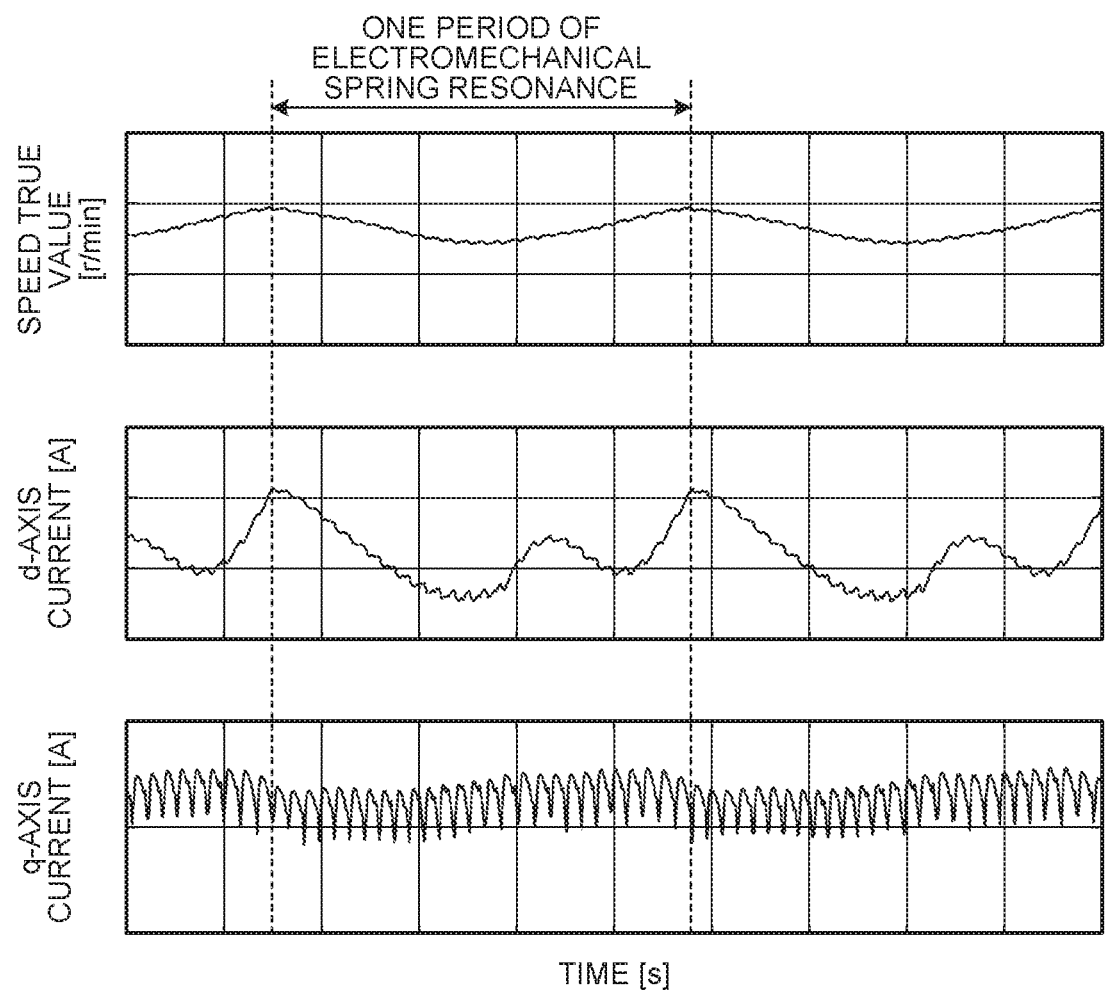
FIG. 14 is a diagram illustrating a speed true value that is the true value of the rotation speed, a d-axis current, and a q-axis current of the secondary synchronous motor when the two synchronous motors are driven in parallel at low speed with output voltage errors equivalent to those of an actual machine added, in the drive system according to the first embodiment.

FIG. 13 is a diagram illustrating a speed true value that is the true value of the rotation speed, the d-axis current, and the q-axis current of the secondary synchronous motor when the two synchronous motors are driven in parallel at low speed, on the assumption that output voltage errors of the power inverter are zero, in the drive system according to the first embodiment. FIG. 14 is a diagram illustrating a speed true value that is the true value of the rotation speed, the d-axis current, and the q-axis current of the secondary synchronous motor when the two synchronous motors are driven in parallel at low speed in the drive system according to the first embodiment in the presence of output voltage errors equivalent to those of an actual machine. FIGS. 13 and 14 illustrate the true value of the rotation speed, the d-axis current, and the q-axis current in that order from the top. The horizontal axes represent time.

Those operating conditions are very hard for the control method disclosed in Patent Literature 1. In the case of the control method disclosed in Patent Literature 1, under such hard operating conditions, the drive of the secondary synchronous motor 1*b* becomes unstable, and the parallel drive is difficult. The above operating conditions mean that the two synchronous motors are driven in parallel at low speed and the angle difference between the magnetic pole positions of the two synchronous motors is near zero. FIGS. 13 and 14 illustrate analysis results under the conditions that the difference between the load torques of the two synchronous motors is extremely small, and the angle difference between the magnetic pole positions of the two synchronous motors is close to zero. A magnetic flux current compensation method uses the angle difference between the two synchronous motors to change the torque of the secondary synchronous motor 1*b*. Thus, if the angle difference is close to zero, it is difficult to reduce speed ripple of the secondary synchronous motor 1*b* completely to zero. Therefore, as illustrated in the first row from the top of FIGS. 13 and 14, the true value of the rotation speed oscillates at the electromechanical spring resonance angular frequency. The rotation speed becomes the largest value in each period of the electromechanical spring resonance angular frequency. As illustrated in the third row from the top in FIGS. 13 and 14, the q-axis current of the secondary synchronous motor 1*b* also oscillates at the electromechanical spring resonance angular frequency as in the true value of the rotation speed. The details of the method of determining the magnetic flux current command will be described later. The d-axis current passed to stabilize the drive of the secondary synchronous motor has its compensation direction that needs to be changed depending on whether the angle difference between the two synchronous motors is positive or negative, as described above. Therefore, the d-axis current has a waveform showing the largest value in each period of the electromechanical spring resonance angular frequency as illustrated in the second row from the top of FIGS. 13 and 14. Under the influence of changes in the sign of the angle difference, thus, the d-axis current contains the pulsation of frequency components that are integral multiples of the electromechanical spring resonance angular frequency. When there are errors in the output voltage of the power inverter 2, pulsating components six times the electrical angular frequency are superimposed on the d- and q-axis currents. Except for that superimposition of pulsating components on the d- and q-axis currents in the presence of the errors in the output voltage of the power inverter 2, there are no major differences between the waveforms of the true value of the rotation speed, the d-axis current, and the q-axis current illustrated in FIG. 13 and the waveforms of the true value of the rotation speed, the d-axis current, and the q-axis current illustrated in FIG. 14.

Figure 15:
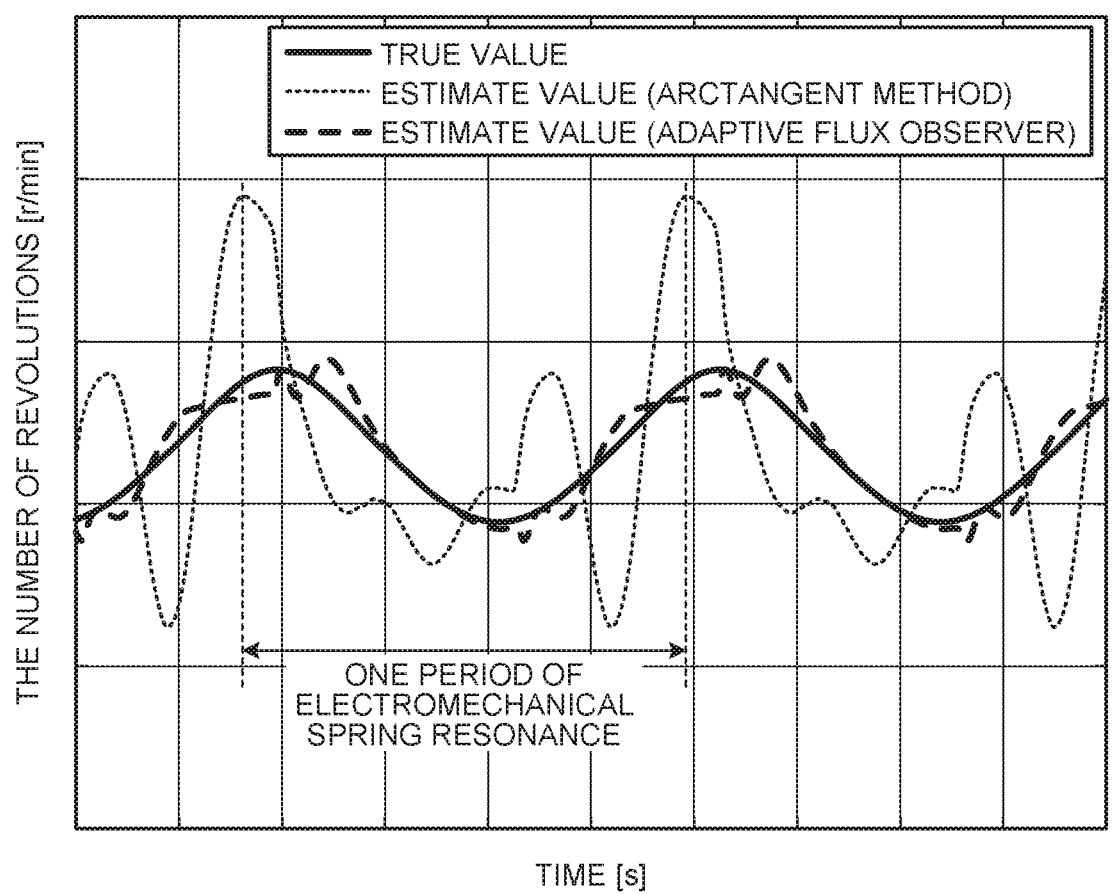
FIG. 15 is a diagram illustrating speed estimate waveforms when the two synchronous motors are driven in parallel at low speed on the assumption that output voltage errors of the power inverter are zero, in the drive system according to the first embodiment.

FIG. 15 is a diagram illustrating speed estimate waveforms when the two synchronous motors are driven in parallel at low speed on the assumption that output voltage errors of the power inverter are zero in the drive system according to the first embodiment. In FIG. 15, the true value of the number of revolutions is indicated by a solid line, the estimate value of the number of revolutions by the arctangent method is indicated by a dotted line, and the estimate value of the number of revolutions by the adaptive flux observer is indicated by a dashed line. The horizontal axis represents time. The vertical axis represents the number of revolutions of the rotor of the secondary synchronous motor 1*b*.

When the two synchronous motors are driven in parallel at low speed in the presence of output voltage errors equivalent to those of an actual machine, transient speed estimate errors occur with changes in the magnetic flux current. From FIG. 15, it is clear that errors in the estimated speeds provided by the adaptive flux observer are smaller than those of the arctangent method, but both methods cause speed estimate errors.

Figure 16:
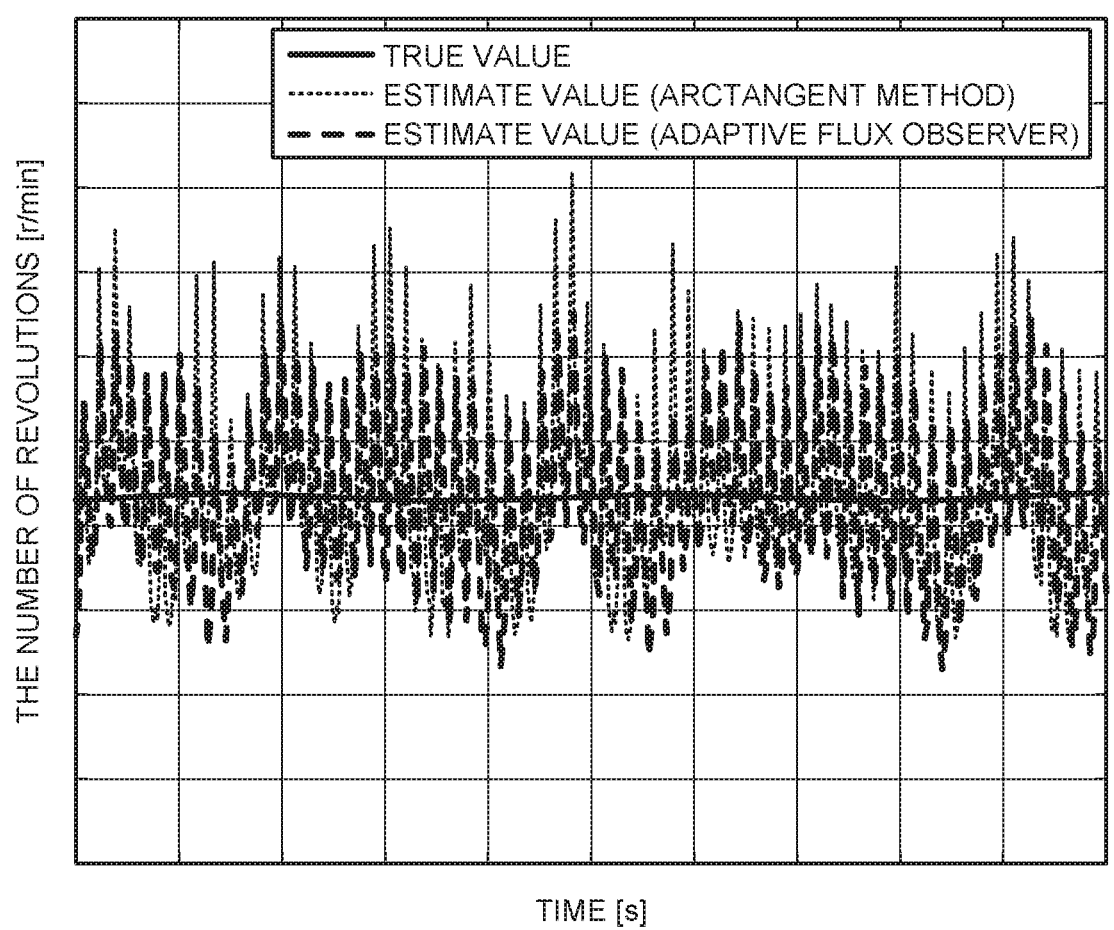
FIG. 16 is a diagram illustrating speed estimate waveforms when the two synchronous motors are driven in parallel at low speed in the drive system according to the first embodiment in the presence of output voltage errors equivalent to those of an actual machine added.

FIG. 16 is a diagram illustrating speed estimate waveforms when the two synchronous motors are driven in parallel at low speed in the drive system according to the first embodiment in the presence of output voltage errors equivalent to those of an actual machine. In FIG. 16, as in FIG. 15, the true value of the number of revolutions is indicated by a solid line, the estimate value of the number of revolutions by the arctangent method is indicated by a dotted line, and the estimate value of the number of revolutions by the adaptive flux observer is indicated by a dashed line. The horizontal axis represents time. The vertical axis represents the number of revolutions of the rotor of the secondary synchronous motor 1*b*.

Some fluid utilization apparatuses using a common drive system set the carrier frequency to 10 kHz or higher to reduce electromagnetic noise. For such a fluid utilization apparatus, output voltage errors tend to increase. A comparison between FIG. 15 and FIG. 16 shows that in FIG. 16, the S/N ratio (Signal to Noise Radio) of the estimated speed waveforms is significantly deteriorated. This tendency is found in speed estimate errors caused by each of the arctangent method and the adaptive flux observer.

Figure 17:
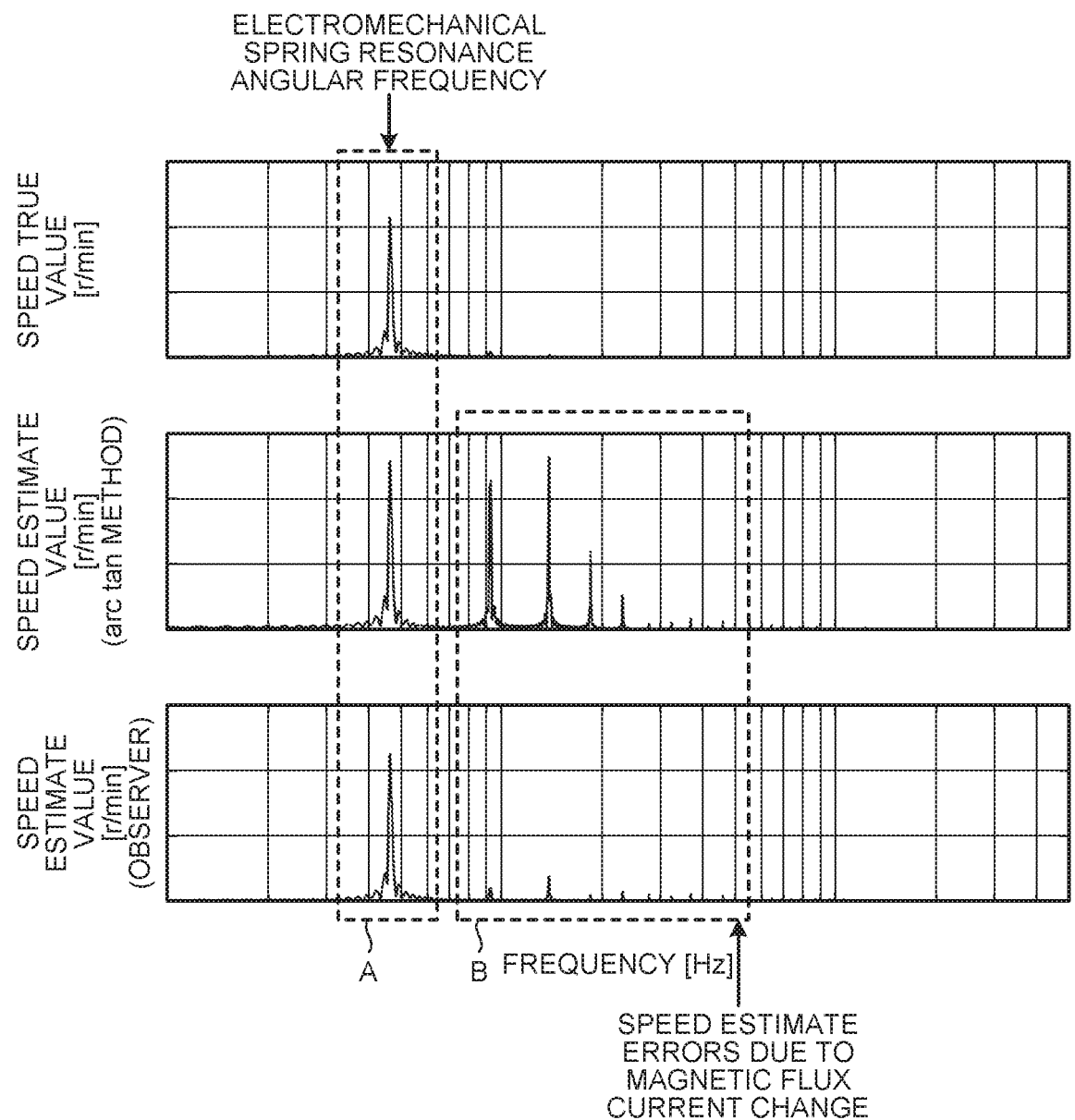
FIG. 17 is a diagram illustrating the results of fast Fourier transform (FFT) analysis of the speed estimate waveforms in FIG. 15.

FIG. 17 is a diagram illustrating the results of FFT analysis of the speed estimate waveforms in FIG. 15. FIG. 17 illustrates the true value of the rotation speed, the speed estimate value by the arctangent method, and the speed estimate value by the adaptive flux observer in order from the top. The horizontal axes represent frequency. From FIG. 17, it is clear that as illustrated in a dotted frame B, speed estimate errors occur at the orders of integral multiples of the electromechanical spring resonance angular frequency. The frequencies of these speed estimate errors match the frequencies of the pulsating components of the magnetic flux current that is the d-axis current illustrated in FIG. 13. Further, as illustrated in a dotted frame A, there are amplitude errors between the true value and the estimate values also at the first-order component of the electromechanical spring resonance angular frequency.

Figure 18:
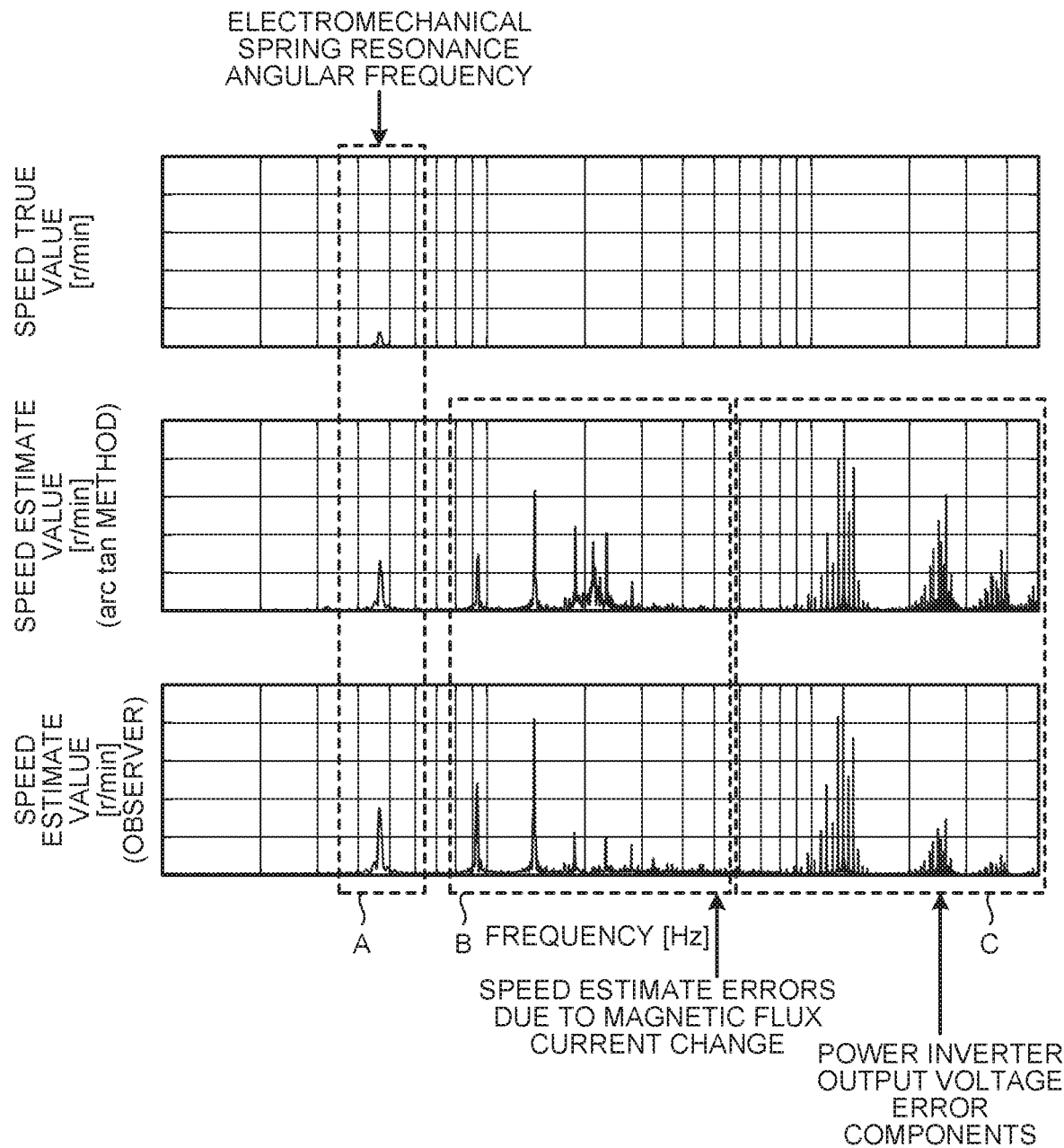
FIG. 18 is a diagram illustrating the results of FFT analysis of the speed estimate waveforms in FIG. 16.

FIG. 18 is a diagram illustrating the results of FFT analysis of the speed estimate waveforms in FIG. 16. Like FIG. 17, FIG. 18 illustrates the true value of the rotation speed, the speed estimate value by the arctangent method, and the speed estimate value by the adaptive flux observer in order from the top. The horizontal axes represent frequency. From FIG. 18, it is clear that as illustrated in a dotted frame A, there are several times greater errors at the first-order component of the electromechanical spring resonance angular frequency. Further, it is clear that as illustrated in a dotted frame B, extremely large peaks appear at the orders of integral multiples of the electromechanical spring resonance angular frequency. Furthermore, as illustrated in a dotted frame C, it is clear that peaks appear on the high frequency side due to output voltage error components of the power inverter 2.

The analysis results illustrated in FIGS. 17 and 18 indicate that a change in the magnetic flux current provides a disturbance for existing speed estimators. When there are no output voltage errors of the power inverter 2 as illustrated in FIG. 17, speed estimate errors occur at the same frequencies as the pulsation frequencies of the magnetic flux current as illustrated in the dotted frame B. As a result, proper speed estimation cannot be performed. When there are output voltage errors of the power inverter 2 as illustrated in FIG. 18, speed estimate errors of the frequency components illustrated in the dotted frame B in FIG. 17 can increase several times to tens of times, which becomes a major problem for the drive system. In Patent Literature 1, the magnetic flux current command is calculated using the speed difference between the two synchronous motors to stabilize the drive of the secondary synchronous motor 1b. In the presence of speed estimate errors as illustrated in the dotted frame B in FIG. 17, however, the secondary synchronous motor 1b cannot be stabilized. The reason is as follows.

First, when the magnetic flux current command is pulsated to stabilize the drive of the secondary synchronous motor 1b, an unexpected error component in speed estimation appears accordingly. If the magnetic flux current command is pulsated at a frequency in order to suppress the error component, the secondary synchronous motor 1b is vibrated, thereby increasing the vibration of the secondary synchronous motor 1b. When the vibration of the secondary synchronous motor 1b increases, the magnetic flux current command of the main synchronous motor 1a must be changed more greatly to stabilize the drive of the secondary synchronous motor 1b. This increases speed estimate errors, which is a vicious cycle. As a result, various phenomena occur in the synchronous motors, such as increases in noise and vibration and a decrease in motor efficiency. Further, there is a possibility that the synchronous motors cannot produce proper torque, and lose synchronism or stop operation.

In particular, when the technique disclosed in Patent Literature 1 is used in a fluid utilization apparatus, a marked phenomenon in which rotation in the low-speed range becomes unstable occurs. The load of a fluid utilization apparatus is often a quadratic-torque load, and its load characteristic is a light load on the low-rpm side. The quadratic-torque load is a load that allows the load torque to increase in proportion to the square of the rotation speed of the motor.

For the fluid utilization apparatus, thus, the torque current decreases on the low-rpm side, and the compensation accuracy of output voltage errors of the power inverter 2 decreases in a region where the current is small. For the fluid utilization apparatus, further, the speed electromotive force of the motor decreases in the low-rpm range. As a result, the influence of output voltage errors becomes relatively large. Consequently, the speed estimate errors described above increase, making it impossible to accurately determine the speed difference between the two synchronous motors, which leads to a state of unstable control. The inventor of the present application has performed various filtering processing on a speed difference signal containing a lot of the speed estimate errors to improve the stability, but has failed to obtain satisfactory performance.

Although it is generally known that output voltage errors cause speed estimate errors on the low-frequency side, the inventor of the present application have studied and found that changing the magnetic flux current causes speed estimate errors, which is not publicly known. Such an issue does not usually arise because a change in the magnetic flux current command is slow. However, the drive system requires a rapid change of the magnetic flux current when the angle difference is close to zero. The inventor of the present application has found during detailed examination of that case that changing the magnetic flux current causes speed estimate errors. Then, the inventor of the present application has come to device a technique of calculating the magnetic flux current command from a pulsating component of the torque current of the secondary synchronous motor 1b as he has considered that it is necessary to establish a technique for eliminating the influence of transient speed estimate errors in order to stably drive the two synchronous motors in parallel even where such speed estimate errors exist. As a result of the investigation by the inventor of the present application, it has been found that when the magnetic flux current command is determined from a pulsating component of the secondary torque current, the S/N ratio of the magnetic flux current command is greatly improved as compared with that of the technique disclosed in Patent Literature 1. The reason is as follows.

As described above, magnetic flux current change causes many error components in the estimated speed signal. To avoid this influence, attention is focused on an estimated magnetic pole position signal. The estimated magnetic pole position signal has high-frequency components of errors in the estimated speed removed by integration processing in the calculation process. As for low-frequency components of the estimated magnetic pole position signal, an error signal caused by a change in the magnetic flux current command remains, but its error falls within several degrees.

Consider the torque current of the secondary synchronous motor 1b. An error between torque current on the true d- and q-axes when phase currents are coordinate-transformed with a true value of the magnetic pole position and an estimated torque current on the d- and q-axes when phase currents are coordinate-transformed with an estimate value of the magnetic pole position is less than several percent if an error in the magnetic pole position is about several degrees. This is obvious because a cosine function can be approximated to one when it is close to zero.

Thus, the torque current of the secondary synchronous motor 1b can be determined with relatively high accuracy even when the magnetic flux current is changed. Although steady position estimation errors may occur due to the influence of variations in motor constant, such errors are DC component estimation errors, and thus do not become a problem when a pulsating component is extracted by the pulsating component extraction unit 7.

There is another reason why it is better to perform stabilizing compensation using the secondary torque current instead of the speed difference. For a fluid utilization apparatus such as a fan or a blower, a mechanical system may have a large moment of inertia. In this case, even when torque pulsation is so large that the inverter stops due to overcurrent, a pulsating component appearing in a speed signal may be very small. In this case, it is better to perform stabilizing compensation when the pulsation of torque current has increased to some extent, instead of performing stabilization after speed pulsation has become so large that speed pulsation can be observed. In this case, a torque current signal has a better S/N ratio than an estimated speed signal, and thus it can be said that it is better to use the torque current signal for stabilizing compensation.

For the above reasons, in the first embodiment, the magnetic flux current command determination unit 9 determines the magnetic flux current command on the basis of a pulsating component of the torque current flowing to the secondary synchronous motor 1b.

Figure 19:
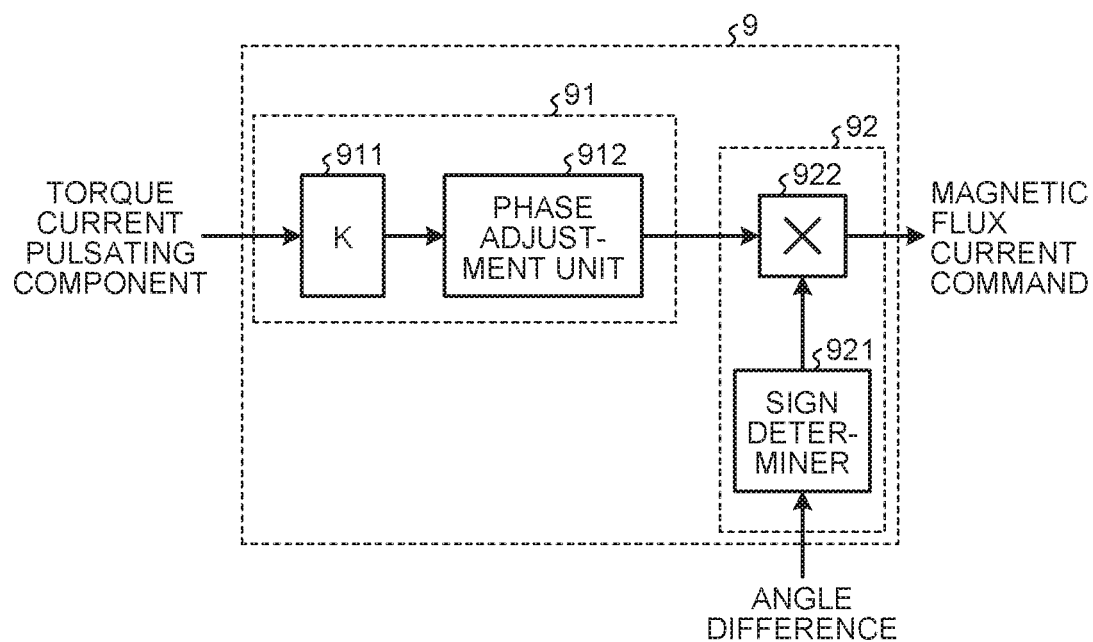
FIG. 19 is a diagram illustrating a configuration example of a magnetic flux current command determination unit illustrated in FIG. 1.
Figure 20:
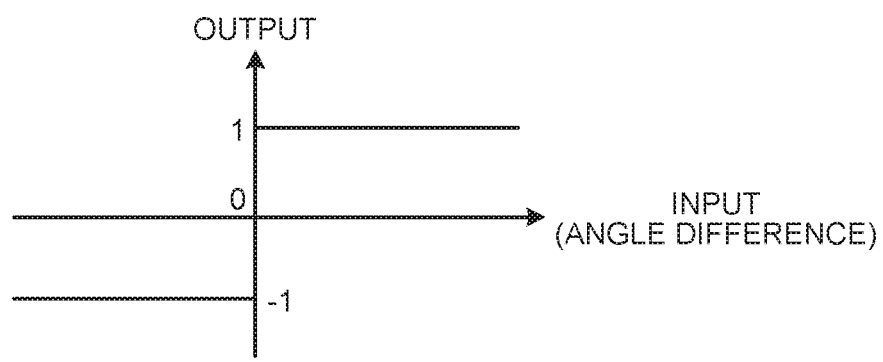
FIG. 20 is a first diagram for explaining sign determination processing performed by a sign determiner illustrated in FIG. 19.
Figure 21:
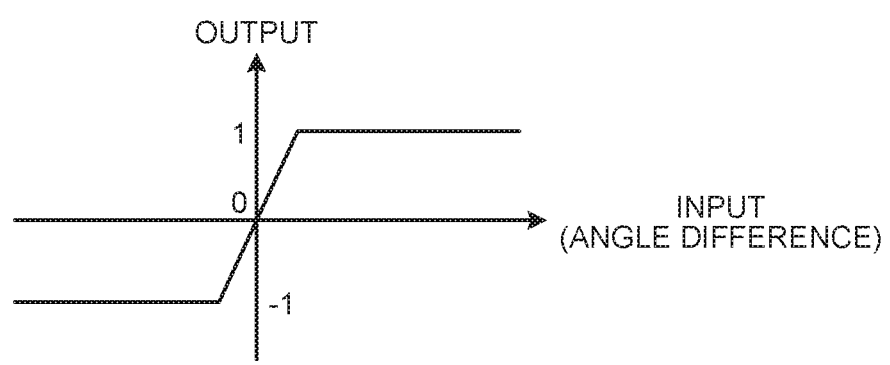
FIG. 21 is a second diagram for explaining the sign determination processing performed by the sign determiner illustrated in FIG. 19.
Figure 22:
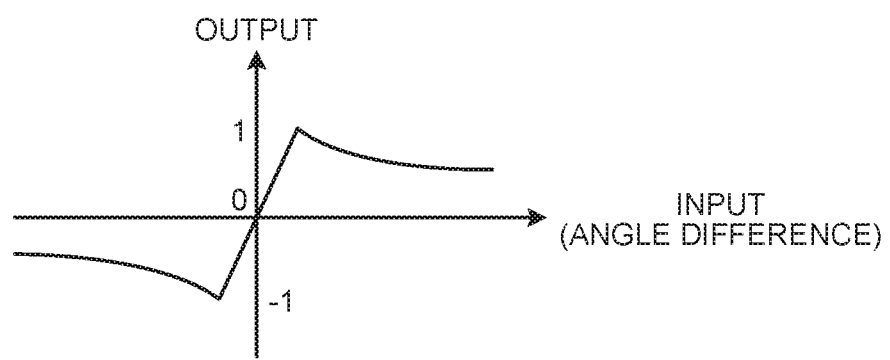
FIG. 22 is a third diagram for explaining the sign determination processing performed by the sign determiner illustrated in FIG. 19.

FIG. 19 is a diagram illustrating a configuration example of the magnetic flux current command determination unit illustrated in FIG. 1. FIG. 20 is a first diagram for explaining sign determination processing performed by a sign determiner illustrated in FIG. 19. FIG. 21 is a second diagram for explaining the sign determination processing performed by the sign determiner illustrated in FIG. 19. FIG. 22 is a third diagram for explaining the sign determination processing performed by the sign determiner illustrated in FIG. 19.

The magnetic flux current command determination unit 9 illustrated in FIG. 19 includes a pulsation suppression control unit 91 and a compensation direction determination unit 92. The magnetic flux current command determination unit 9 receives a pulsating component of the torque current of the secondary synchronous motor 1b, and determines the magnetic flux current command, using the pulsation suppression control unit 91 and the compensation direction determination unit 92. The pulsation suppression control unit 91 includes a gain multiplication unit 911 and a phase adjustment unit 912.

The gain multiplication unit 911 adjusts gain of the torque current pulsating component that is the input signal. The phase adjustment unit 912 adjusts the phase of the torque current pulsating component that is the input signal, and outputs the pulsating component whose amplitude has been adjusted. If the stability of the system can be provided by only one of the gain multiplication unit 911 and the phase adjustment unit 912, the pulsation suppression control unit 91 does not necessarily need to include both the gain multiplication unit 911 and the phase adjustment unit 912.

The gain multiplication unit 911 has a role of adjusting the stability and responsiveness of the system as the gain multiplication unit 911 multiplies the torque current pulsating component that is the input signal, by a specific gain and outputs the result of the multiplication. The gain may be changed in accordance with operating conditions. For example, the gain may be increased in the low-speed range, and the gain may be reduced in the high-speed range. The phase adjustment unit 912 is formed, for example, by a phase lag compensator, a low-pass filter, an integrating controller, or the like. Phase lag compensators reduce gain by a certain value in the high-frequency range for stabilization, and are commonly used in industry. Low-pass filters and integrating controllers also have a property of changing a signal phase in the high-frequency range. Thus, a low-pass filter or an integrating controller can be used like a phase lag compensator.

When an approximate integrator using a first-order low-pass filter is used as the phase adjustment unit 912, a cutoff angular frequency of the approximate integrator is preferably set to ⅓ or lower the electromechanical spring resonance angular frequency. If possible, the cutoff angular frequency is set to a value of ⅒ to 1/20 the electromechanical spring resonance angular frequency. With this setting, the phase can be delayed by about 90 degrees in the vicinity of the electromechanical spring resonance angular frequency, enhancing control stability.

Although not illustrated in FIG. 19, a dead zone may be provided at either the input or output of the pulsation suppression control unit 91. The dead zone is useful for removing frequency components other than the electromechanical spring resonance which have not been able to be completely removed by the pulsating component extraction unit 7 described above.

The compensation direction determination unit 92 includes a sign determiner 921 and a multiplier 922. In accordance with the operation principle described with reference to FIGS. 5 to 11, the compensation direction determination unit 92 determines the direction of compensation of the magnetic flux current command from the angle difference between the magnetic pole positions of the rotors of the two synchronous motors. The sign determiner 921 performs the sign determination processing illustrated in FIGS. 20 to 22. The horizontal axes in FIGS. 20 to 22 represent the angle difference that is the input of the sign determiner 921. The angle difference has a positive or negative value as illustrated in FIG. 11. The vertical axes in FIGS. 20 to 22 represent the value of output of the sign determiner 921.

The most basic sign determination processing is a method illustrated in FIG. 20. The sign determiner 921 outputs "1" when the angle difference is positive, and outputs "−1" when the angle difference is negative. However, in the method of FIG. 20, chattering may occur when the angle difference is close to zero. Therefore, as in FIG. 21, in a region where the angle difference is close to zero, the output of the sign determiner 921 may be gradually switched from "1" to "−1", or the output of the sign determiner 921 may be gradually switched from "−1" to "1".

Under conditions where the angle difference is large, the influence of the change amount of the magnetic flux current of the main synchronous motor 1a on the change amount of the torque of the secondary synchronous motor 1b is greater than that under conditions where the angle difference is small. Therefore, as in FIG. 22, in a region where the angle difference is large, the output value of the sign determiner 921 may be gradually reduced as the angle difference increases.

The multiplier 922 multiplies the output of the sign determiner 921 by the output of the pulsation suppression control unit 91 to thereby generate the magnetic flux current command. That is, the magnetic flux current command determination unit 9 determines the magnetic flux current command, from the pulsating component suppressed by the pulsation suppression control unit 91 and the compensation direction determined by the sign determiner 921 of the compensation direction determination unit 92. The effect of using the magnetic flux current command generated in this way is as follows.

For the drive system employing the position sensorless control, as described above so far, transient speed estimate errors occur due to a change in the magnetic flux current command at the time of low-speed drive. The method of stabilizing the drive of the secondary synchronous motor 1b using the speed difference as disclosed in Patent Literature 1 is directly affected by speed estimate errors, which results in an unstable control state, causing various problems such as increases in noise and vibration and a decrease in motor efficiency. For this reason, Patent Literature 1 encounters a problem of necessity of increasing the lower limit of the number of revolutions as compared with an existing synchronous motor drive system including a single power inverter that drive a single synchronous motor. Therefore, it is difficult to replace an existing synchronous motor drive system with a parallel drive system using the technique disclosed in Patent Literature 1.

By contrast, the drive system 100 according to the first embodiment determines the magnetic flux current command, using the pulsating component of the torque current of the secondary synchronous motor 1b and the angle difference between the magnetic pole positions of the two synchronous motors. Consequently, the magnetic flux current command is improved in S/N ratio, and is less likely to be affected by speed estimate errors. As a result, problems such as increases in noise and vibration, a decrease in motor efficiency, and a loss of synchronism are solved. Further, since the stability at the time of low-speed drive is improved, the lower limit of the number of revolutions can be kept at a value equivalent to that of existing synchronous motor drive systems that drive a single synchronous motor with a single power inverter. This facilitates replacement of an existing synchronous motor drive system with the drive system 100 according to the first embodiment.

Second Embodiment

A second embodiment described below provides a configuration example in which a magnetic flux current is determined using a pulsating component of active power consumed by the secondary synchronous motor 1b. In order to solve problems such as increases in noise and vibration and a decrease in motor efficiency, it is necessary to accurately detect the self-oscillation phenomenon of the secondary synchronous motor 1b due to the electromechanical spring resonance even under conditions where the magnetic flux current changes greatly. One method for that purpose is the method using the pulsating component of the torque current described in the first embodiment. However, if the moment of inertia of mechanical systems that are loads connected to the main synchronous motor 1a and the secondary synchronous motor 1b is relatively large, the magnetic flux current may be determined using the pulsating component of the active power instead of the pulsating component of the torque current. For a fluid utilization apparatus such as a fan or a blower, as described above, the moment of inertia of mechanical systems may be large. In this case, it is better to observe the pulsating component of the active power rather than observe the estimated speed signal.

Figure 23:
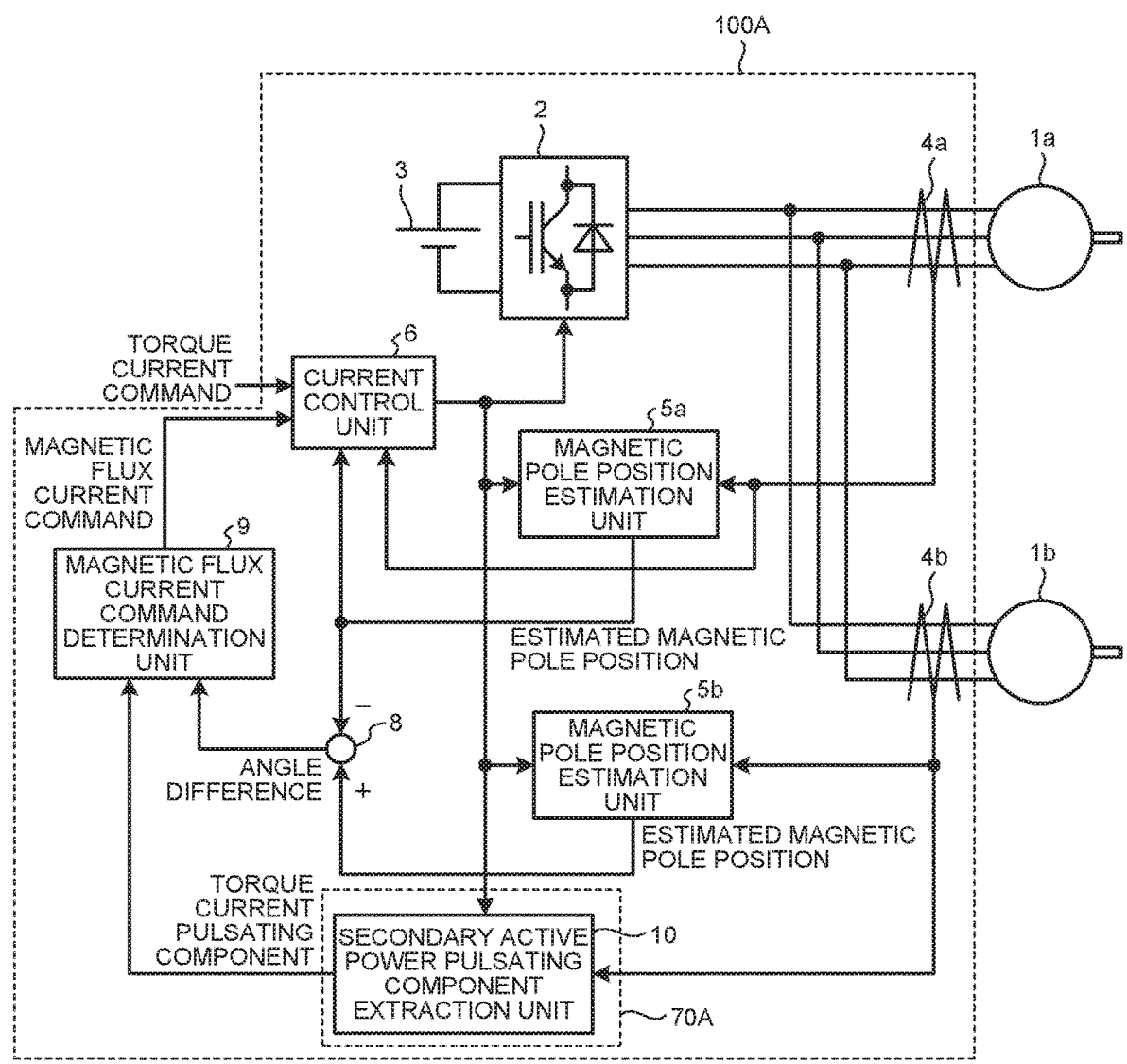
FIG. 23 is a diagram illustrating a configuration of a drive system according to a second embodiment of the present invention.

FIG. 23 is a diagram illustrating a configuration of a drive system according to the second embodiment of the present invention. A drive system 100A according to the second embodiment includes a pulsating component extraction unit 70A in place of the pulsating component extraction unit 70 illustrated in FIG. 1. The pulsating component extraction unit 70A includes a secondary active power pulsating component extraction unit 10. The other components are the same as or equivalent to those of the first embodiment. The same reference numerals are assigned to the same or equivalent components without duplicated explanations.

Active power $P_x$ can be determined by formula (18) below using three-phase voltage commands $v_u^*$, $v_v^*$, and $v_w^*$ and phase currents $i_u^*$, $i_v^*$, and $i_w^*$. Subscripts "x" are for distinguishing between the main one and the secondary one. $R_a$ is the armature resistance. The three-phase voltage commands $v_u^*$, $v_v^*$, and $v_w^*$ are obtained from the current control unit 6. The phase currents $i_u^*$, $i_v^*$, and $i_w^*$ are obtained from the current detection unit 4b.

[Formula 18]

$$P_x = (v_u^* i_{ux} + v_v^* i_{vx} + v_w^* i_{wx}) - R_a(i_{ux}^2 + i_{vx}^2 + i_{wx}^2) \qquad (18)$$

The second term on the right side of formula (18) above represents copper loss due to the armature resistance. Strictly speaking, the copper loss is also part of the active power, but it is preferable to subtract the copper loss because required information corresponds to the torque pulsation of the secondary synchronous motor 1b. The armature resistance may be small enough to be negligible in which case only the first term on the right side may be calculated.

If the moment of inertia of the mechanical system is large, but speed pulsation is minute, it is thought that the pulsation of the active power is produced by the pulsation of the torque. Therefore, in this case, the secondary active power pulsating component extraction unit 10 performs arithmetic processing similar to that of the secondary torque current pulsating component extraction unit 7 described in the first embodiment, to extract a pulsating component from the active power of the secondary synchronous motor 1b. Determining the magnetic flux current command using this information can provide the same effects as those of the first embodiment.

Although the magnetic flux current command determination unit 9 of the second embodiment includes the pulsation suppression control unit 91 including the gain multiplication unit 911 and the phase adjustment unit 912 as in the first embodiment, the gain multiplication unit 911 of the second embodiment adjusts gain of the active power pulsating component that is the input signal, and the phase adjustment unit 912 of the second embodiment adjusts the phase of the active power pulsating component that is the input signal. As in the first embodiment, if the stability of the system can be provided by only one of the gain multiplication unit 911 and the phase adjustment unit 912, the pulsation suppression control unit 91 of the second embodiment does not necessarily need to include both the gain multiplication unit 911 and the phase adjustment unit 912.

The second embodiment is useful when the moment of inertia of the loads connected to the synchronous motors is large. Also, the second embodiment, which does not use the coordinate transformation operation, provides a small amount of calculation as compared with the first embodiment and thus is useful when an arithmetic device of a simple configuration is used. Specifically, the secondary torque current pulsating component extraction unit 7 of the first embodiment transforms the coordinates of the currents in the three-phase coordinate system detected by the current detection unit 4b into the rotating rectangular coordinate system, using the signal from the magnetic pole position estimation unit 5b, determines the torque current, and extracts the pulsating component of the torque current. In contrast, in the second embodiment, the secondary active power pulsating component extraction unit 10 determines the active power, using the currents in the three-phase coordinate system detected by the current detection unit 4b as they are, and extracts the pulsating component of the active power, as shown in formula (18) above. Then, the magnetic flux current command determination unit 9 of the second embodiment can determine the magnetic flux current command, using the pulsating component. Thus, the second embodiment eliminates the need for coordinate transformation, reducing the amount of calculation. In applications where the moment of inertia is large, observing the pulsating component of the active power as described above reduces the coordinate transformation by onetime. Thus, the second embodiment can reduce calculation load.

Third Embodiment

Figure 24:
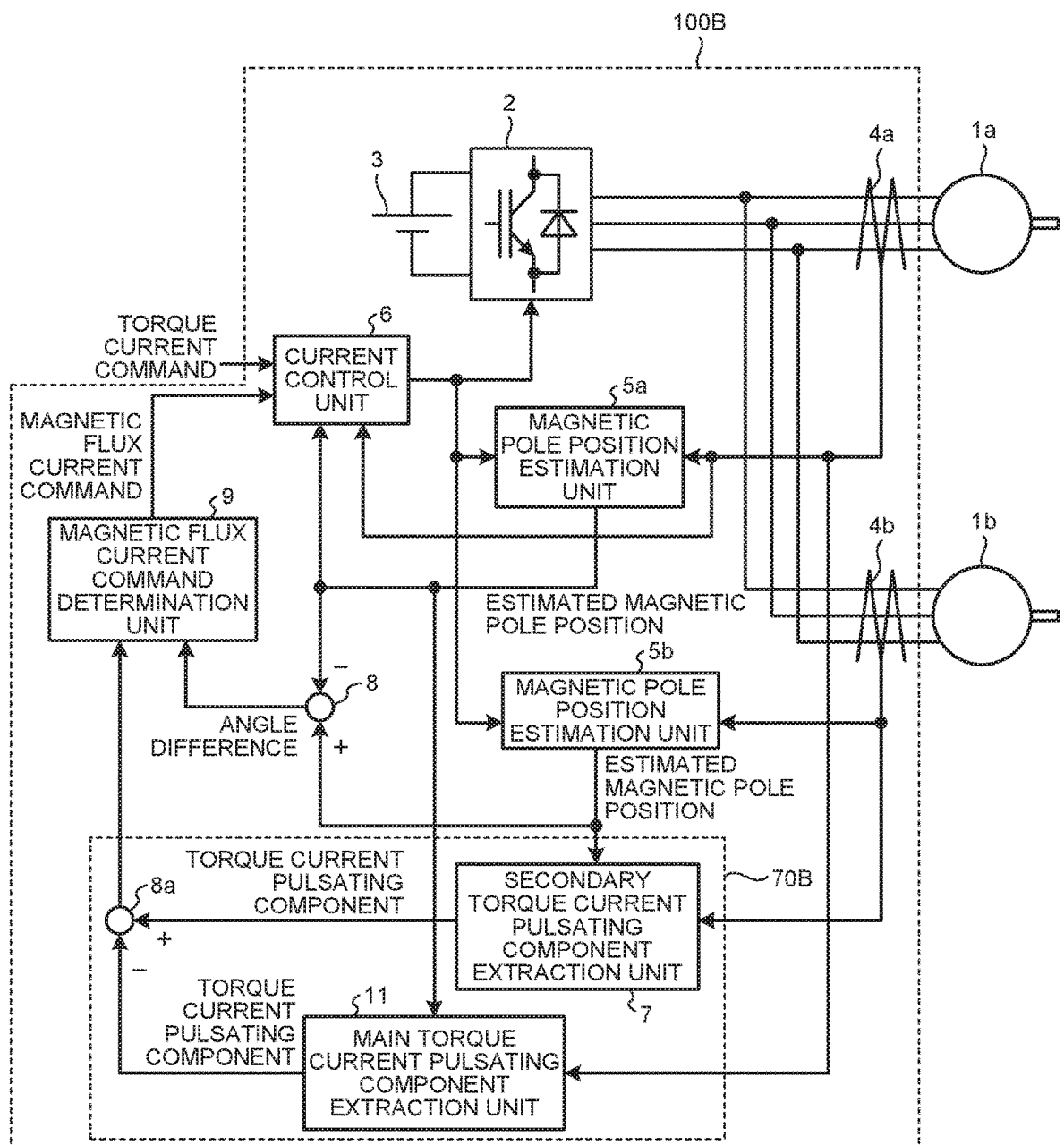
FIG. 24 is a diagram illustrating a configuration of a drive system according to a third embodiment of the present invention.

FIG. 24 is a diagram illustrating a configuration of a drive system according to a third embodiment of the present invention. A drive system 100B according to the third embodiment includes a pulsating component extraction unit 70B in place of the pulsating component extraction unit 70 illustrated in FIG. 1. The pulsating component extraction unit 70B includes the secondary torque current pulsating component extraction unit 7, a main torque current pulsating component extraction unit 11, and a subtracter 8a that is a second subtracter. The other components are the same as or equivalent to those of the first embodiment. The same reference numerals are assigned to the same or equivalent components without duplicated explanations.

The third embodiment described below provides a configuration example in which the magnetic flux current command is determined from the difference between the pulsating component of the torque current of the secondary synchronous motor 1b and the pulsating component of the torque current of the main synchronous motor 1a. The drive systems 100 and 100A of the first and second embodiments are configured on the assumption that the pulsating component of the torque current of the main synchronous motor 1a is minute in a steady state. Since the main synchronous motor 1a is vector-controlled, if the torque current command value is a constant value, the torque current of the main synchronous motor 1a should follow the command value. However, in fact, the torque current of the main synchronous motor 1a pulsates due to various disturbance factors. Possible disturbance factors include a time during which to prevent short-circuiting of the semiconductor devices of the series-connected upper and lower arms of the power inverter 2, offset of current sensors, gain imbalance of current sensors, distortion of magnetic flux produced from the magnets provided to the rotor, etc. Torque current pulsation due to these factors occurs in the secondary synchronous motor 1b alike. In the first and second embodiments, if some AC component is superimposed on the torque current command, this also becomes a disturbance to the magnetic flux current command determination unit 9. A disturbance component superimposed on the torque current command causes torque current pulsation of that frequency also in the secondary synchronous motor 1b. Since such a disturbance component is produced by other than self-oscillation due to electromechanical spring resonance, it is not appropriate to feed that disturbance component back to the magnetic flux current command determination unit.

The secondary torque current pulsating component extraction unit 7 of the first embodiment and the main torque current pulsating component extraction unit 11 of the third embodiment are formed by a high-pass filter, a bandpass filter, or the like. In order to stabilize the secondary synchronous motor 1b more accurately, it is desirable to eliminate the influence of the above-mentioned disturbance factors. Unfortunately, a high-pass filter has poor disturbance removal characteristics. Even in the case of a bandpass filter, measurement of the electromechanical spring resonance angular frequency is required in order to improve disturbance removal characteristics. In view of these circumstances, in order to eliminate the influence of disturbances in a simpler manner, the third embodiment is configured to subtract the pulsating component of the torque current generated in the main synchronous motor 1a from the pulsating component of the torque current of the secondary synchronous motor 1b.

Thus, the drive system 100B according to the third embodiment includes the main torque current pulsating component extraction unit 11 in addition to the secondary torque current pulsating component extraction unit 7. Further, the drive system 100B includes the subtracter 8a that determines the difference between the torque current pulsating component from the secondary torque current pulsating component extraction unit 7 and the torque current pulsating component from the main torque current pulsating component extraction unit 11.

The main torque current pulsating component extraction unit 11 calculates the pulsating component of the torque current of the main synchronous motor 1a. The calculation method may be a method similar to that of the secondary torque current pulsating component extraction unit 7 described in the first embodiment. The subtracter 8a calculates the difference between the pulsating components of the torque currents generated in the two synchronous motors. The magnetic flux current command determination unit 9 determines the magnetic flux current command, using the difference.

This configuration allows more stable parallel drive of the two synchronous motors. Although the third embodiment described above provides the method of using the difference between the pulsating components of the torque currents generated in the two synchronous motors, the difference between the pulsating components of the active power may be used instead as a matter of course. Further, the drive system 100B of the third embodiment may be configured such that one of the secondary torque current pulsating component extraction unit 7 and the main torque current pulsating component extraction unit 11 calculates the pulsation of the torque current, and the other calculates the pulsation of the active power, and then these pulsations are converted on the same scale to determine the difference therebetween.

Fourth Embodiment

Figure 25:
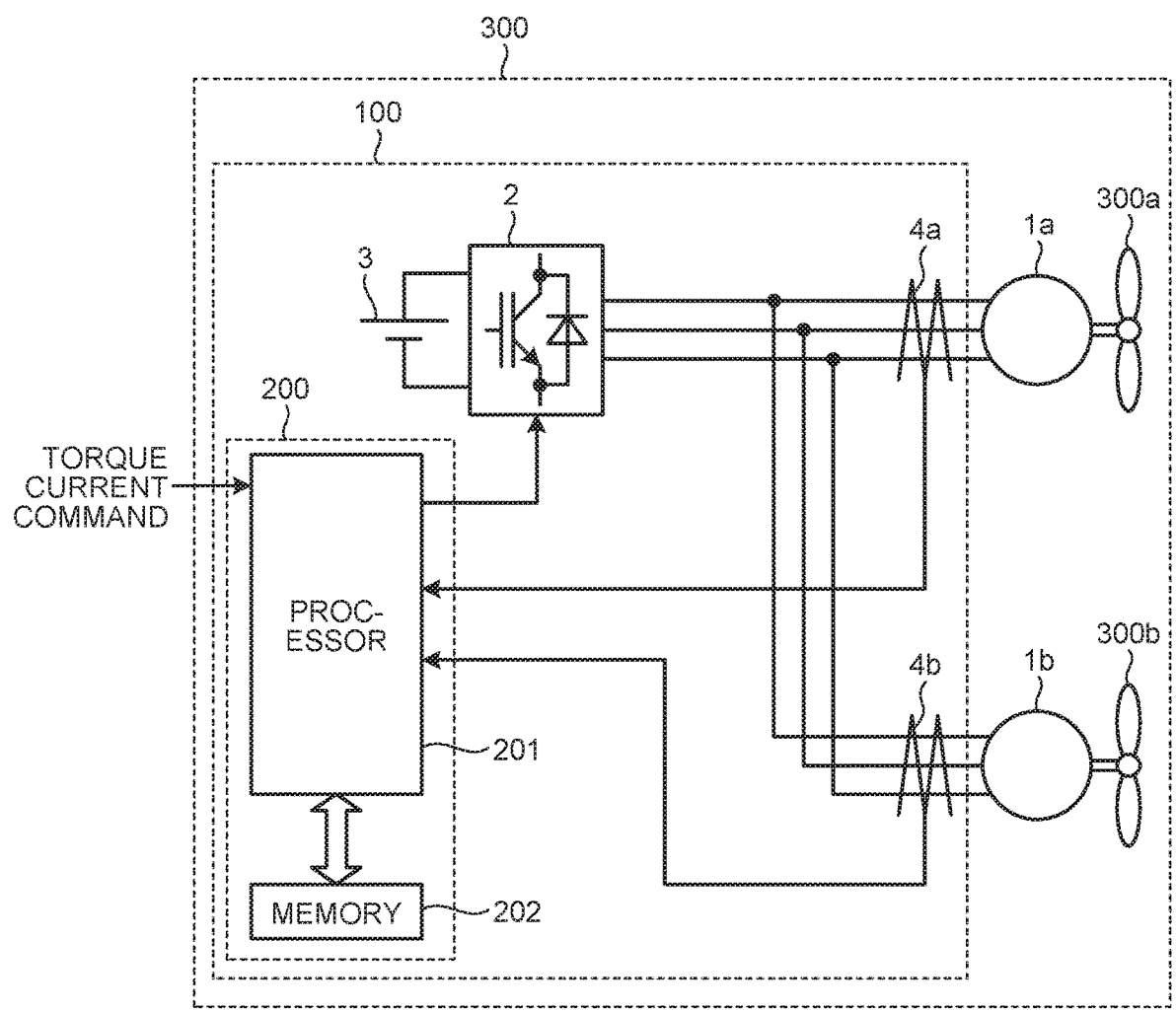
FIG. 25 is a configuration diagram of a fluid utilization apparatus according to a fourth embodiment of the present invention.

A fourth embodiment described below provides a configuration example of a fluid utilization apparatus using the drive system 100, 100A, or 100B according to the first, second, or third embodiment. FIG. 25 is a configuration diagram of a fluid utilization apparatus according to the fourth embodiment of the present invention. The fourth embodiment provides a fluid utilization apparatus 300 including a propeller fan 300a provided on the rotating shaft of the main synchronous motor 1a, and a propeller fan 300b provided on the rotating shaft of the secondary synchronous motor 1b.

The fluid utilization apparatus 300 illustrated in FIG. 25 includes the drive system 100 of the first embodiment, and the drive system 100 includes a power inverter drive 200. The power inverter drive 200 includes a processor 201 and memory 202. The functions illustrated in FIG. 1, that is, the functions of the current control unit 6, the magnetic pole position estimation units 5a and 5b, the secondary torque current pulsating component extraction unit 7, the subtracter 8, and the magnetic flux current command determination unit 9 are implemented using the processor 201 and the memory 202.

When the processor 201 and the memory 202 are used as illustrated in FIG. 25, each of the above-described functions is implemented by software, firmware, or a combination of them. The software or firmware is described as programs and stored in the memory 202. The processor 201 reads and executes the programs stored in the memory 202. These programs can be said to cause a computer to execute procedures and methods executed by the above-described functions. The memory 202 corresponds to semiconductor memory such as Random Access Memory (RAM), Read Only Memory (ROM), a flash memory, an Erasable Programmable Read Only Memory (EPROM), or an Electrically Erasable Programmable Read Only Memory (EEPROM) (registered trademarks). The semiconductor memory may be nonvolatile memory or volatile memory. Other than the semiconductor memory, the memory 202 corresponds to a magnetic disk, a flexible disk, an optical disk, a compact disk, a mini disk, or a Digital Versatile Disc (DVD). The processor 201 may output or store data such as calculation results to or in the memory 202, or may store the data in an auxiliary storage device (not illustrated) via the memory 202.

Instead of the drive system 100, the fluid utilization apparatus 300 may include the drive system 100A of the second embodiment or the drive system 100B of the third embodiment. In this case, the functions of the current control unit 6, the magnetic pole position estimation units 5a and 5b, the secondary active power pulsating component extraction unit 10, the subtracter 8, and the magnetic flux current command determination unit 9 illustrated in FIG. 23 are implemented using the processor 201 and the memory 202. The functions of the current control unit 6, the magnetic pole position estimation units 5a and 5b, the secondary torque current pulsating component extraction unit 7, the main torque current pulsating component extraction unit 11, the subtracter 8, the subtracter 8a, and the magnetic flux current command determination unit 9 illustrated in FIG. 24 are implemented using the processor 201 and the memory 202.

As described in the first embodiment, the power inverter 2 may basically have any circuit configuration that can supply desired AC power to the main synchronous motor 1a and the secondary synchronous motor 1b. Information on the currents detected by the current detection units 4a and 4b is transmitted to the processor 201.

The two propeller fans 300a and 300b may be of the same shape or of different shapes. Air flow paths of the two propeller fans 300a and 300b do not necessarily need to be the same. For example, if the fluid utilization apparatus 300 is an air conditioner, the two propeller fans 300a and 300b correspond to two blowing fans provided in a blowing chamber in an outdoor unit of the air conditioner, and the air flow paths correspond to the blowing chamber. The blowing chamber is a space formed by being surrounded by side plates, a ceiling plate, a bottom plate, a heat exchanger, and others of the outdoor unit. In the blowing chamber, flows of air are formed by the rotation of the propeller fans 300a and 300b.

If the characteristics of the number of revolutions and the load torque of the two propeller fans 300a and 300b are different, it is easier to drive them in parallel stably. Therefore, the two synchronous motors may be provided with fans of different shapes. The cross-sectional area of the flow path in which one fan is provided may be made smaller than the cross-sectional area of the flow path in which the other fan is provided. Further, a fluid utilization apparatus with different specifications may be driven in which, for example, a propeller fan is driven by one synchronous motor, and a pump is driven by the other synchronous motor.

Although not illustrated in FIG. 25, the fluid utilization apparatus 300 may include a voltage detection unit that detects voltage output by the power inverter 2 so that voltage information detected by the voltage detection unit is input to the processor 201. Although not illustrated in FIG. 25, the fluid utilization apparatus 300 may include an air velocity sensor that measures the air velocity of the fans so that air velocity information detected by the air velocity sensor is input to the processor 201. Although not illustrated in FIG. 25, a temperature sensor that detects the temperature of an object cooled by the fans may be provided so that temperature information detected by the temperature sensor is input to the processor 201.

The fluid load of the fluid utilization apparatus 300 has a damper property. In the high-rpm range, the damper property stabilizes the synchronous motor driven in the open loop. However, in the low-rpm range, the damper property becomes weak, and the drive of the synchronous motor becomes unstable. Therefore, the fluid utilization apparatus 300 uses the parallel drive method described in the first, second, or third embodiment. Consequently, the fourth embodiment achieves parallel drive of the synchronous motors in a wide speed range. Further, the fourth embodiment does not need advanced torque control. Thus, modifying an existing synchronous motor drive system including a single power inverter that drives a single synchronous motor can provide the fluid utilization apparatus 300 that can drive the two propeller fans 300a and 300b and prevent an increase in cost as well.

Fifth Embodiment

Figure 26:
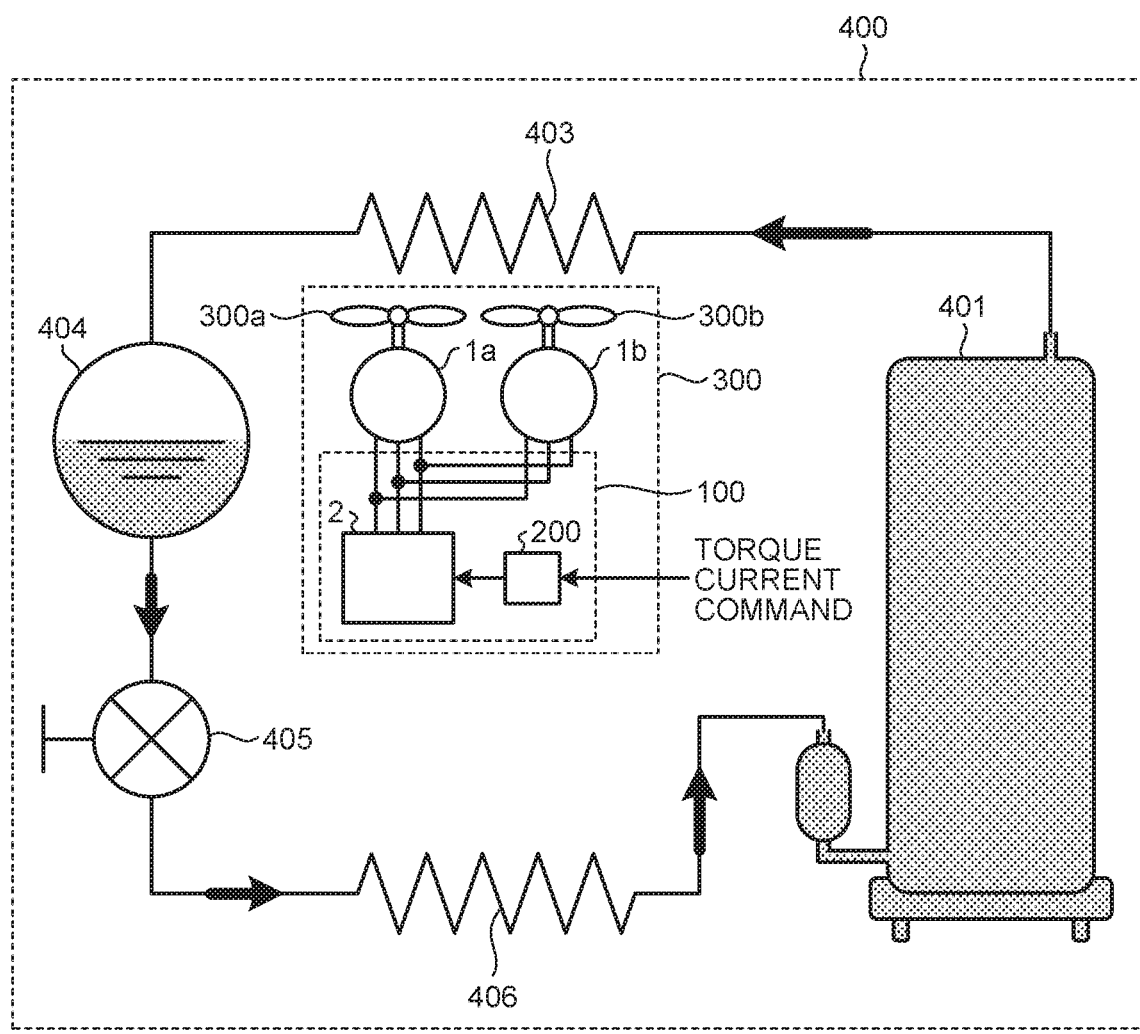
FIG. 26 is a configuration diagram of an air conditioner according to a fifth embodiment of the present invention.

A fifth embodiment describes a configuration example of an air conditioner using the fluid utilization apparatus 300 according to the fourth embodiment. FIG. 26 is a configuration diagram of an air conditioner according to the fifth embodiment of the present invention. An air conditioner 400 according to the fifth embodiment includes the fluid utilization apparatus 300, a refrigerant compressor 401, a condenser 403, a receiver 404, an expansion valve 405, and an evaporator 406. The refrigerant compressor 401 and the condenser 403 are connected by piping. Likewise, the condenser 403 and the receiver 404 are connected by piping, the receiver 404 and the expansion valve 405 are connected by piping, the expansion valve 405 and the evaporator 406 are connected by piping, and the evaporator 406 and the refrigerant compressor 401 are connected by piping. Consequently, a refrigerant circulates through the refrigerant compressor 401, the condenser 403, the receiver 404, the expansion valve 405, and the evaporator 406. Although not illustrated in FIG. 26, the fluid utilization apparatus 300 includes the current detection units 4a and 4b, the magnetic pole position estimation units 5*a* and 5*c*, and others illustrated in FIG. 1 and other drawings.

The air conditioner 400 repeatedly perform process steps of refrigerant evaporation, compression, condensation, and expansion. Thus, the refrigerant changes from liquid to gas, and further changes from gas to liquid, so that heat exchange is performed between the refrigerant and the air outside the machine.

The evaporator 406 has a cooling function of evaporating the refrigerant liquid under low pressure conditions and taking heat from the air around the evaporator 406. The refrigerant compressor 401 compresses the refrigerant gas gasified by the evaporator 406, condensing the refrigerant into a high-pressure gas. The condenser 403 releases heat of the refrigerant gas that has raised to a high temperature in the refrigerant compressor 401, condensing the high-pressure refrigerant gas into a refrigerant liquid. The fluid utilization apparatus 300 generates currents of air by rotating the propeller fans 300*a* and 300*b*, and passes the currents of air through the condenser 403, thereby cooling the condenser 403. The expansion valve 405 throttles and expands the refrigerant liquid to evaporate the refrigerant, and converts the refrigerant liquid into a low-pressure liquid. The receiver 404 is provided for adjusting the amount of the circulating refrigerant, and may be omitted in a small apparatus.

If the condenser 403 becomes larger as the air conditioner 400 has greater output power, it becomes necessary to increase the cooling performance of the fluid utilization apparatus 300 that functions as a cooling apparatus for cooling the condenser 403. However, it is troublesome to change the specifications of the fluid utilization apparatus 300 that functions as the cooling apparatus in accordance with an increase in the size of the condenser 403. Further, in order to increase the output power of the fluid utilization apparatus 300 to increase the cooling performance of the fluid utilization apparatus 300, it may become necessary to change a production line for mass-producing the fluid utilization apparatus 300, resulting in an increased initial investment to build the production line. Therefore, the large-size air conditioner 400 uses the fluid utilization apparatus 300 including a plurality of cooling fans to improve the cooling performance.

Further, a cost reduction is highly required of the air conditioner 400. On the other hand, improved efficiency is also required because energy-saving regulations are being strengthened year by year. Recent energy-saving regulations place importance on not only a rated operating point but also drive efficiency at an operating point of low-output drive. Therefore, it is necessary to reduce the lower limit of the operating number of revolutions of the cooling fans to a minimum.

As described so far, a parallel drive system using the technique disclosed in Patent Literature 1 is excellent in cost, but poses a problem of the unstable drive in the low-rpm range if such a system is configured with position sensorless control. For the air conditioner 400, in particular, to reduce carrier noise generated in the power inverter 2 of the fluid utilization apparatus 300, the carrier frequency is often set high to 10 kHz or higher. As a result, output voltage errors increase, and the drive in the low-rpm range tends to be unstable. Thus, where the air conditioner 400 uses a parallel drive system using the technique disclosed in Patent Literature 1, a problem of the drive operating range of the air conditioner 400 being narrowed arises. For a parallel drive system using the technique disclosed in Patent Literature 1, therefore, it is difficult to achieve both cost reduction and high cooling performance required of the cooling fans for the air conditioner 400.

The air conditioner 400 according to the fifth embodiment, which uses the parallel drive methods described in the first to third embodiments, does not become unstable in low-speed-range drive, and can increase a drivable range. Further, the parallel drive methods described in the first to third embodiments are based on position sensorless control, and thus can reduce the manufacturing cost of the air conditioner 400 as compared with a case where position sensors are used. Accordingly, the drive systems 100, 100A, and 100B according to the first to third embodiments can achieve both cost reduction and high cooling performance required of the cooling fans for the air conditioner 400.

The configurations described in the above embodiments illustrate an example of the subject matter of the present invention, and can be combined with another known art, and can be partly omitted or changed without departing from the scope of the present invention.

The invention claimed is:

1. A drive system comprising:
   a power inverter to supply power to a first synchronous motor and a second synchronous motor connected in parallel to each other;
   a first current detector to detect a first current flowing to the first synchronous motor;
   a second current detector to detect a second current flowing to the second synchronous motor;
   a processor; and
   a memory to store a program which, when executed by the processor, performs:
   a first magnetic pole position estimation process of estimating a first magnetic pole position of a rotor of the first synchronous motor, using a voltage command for driving the first synchronous motor and the first current;
   a second magnetic pole position estimation process of estimating a second magnetic pole position of a rotor of the second synchronous motor, using the voltage command and the second current;
   a control process of outputting the voltage command, using a torque current command, a magnetic flux current command, the first current, and the first magnetic pole position;
   a pulsating component extraction process of extracting at least one of a torque current pulsating component and an active power pulsating component, the torque current pulsating component being contained in a torque current flowing to the second synchronous motor, the active power pulsating component contained in active power consumed by the second synchronous motor;
   a first subtraction process of determining an angle difference that is a difference between the magnetic pole positions of the rotors of the first synchronous motor and the second synchronous motor, using the first magnetic pole position and the second magnetic pole position; and
   a magnetic flux current command determination process of determining the magnetic flux current command, using the pulsating component extracted by the pulsating component extraction process and the angle difference.

2. The drive system according to claim 1, wherein
   the pulsating component extraction process comprises
   a second subtraction process of determining a difference between a torque current pulsating component contained in a torque current flowing to the first synchronous motor and the torque current pulsating component contained in the torque current flowing to the second synchronous motor, and outputting the difference as the pulsating component.

3. The drive system according to claim 1, wherein
the pulsating component extraction process comprises
a second subtraction process of determining a difference between an active power pulsating component contained in active power consumed by the first synchronous motor and the active power pulsating component contained in the active power consumed by the second synchronous motor, and outputting the difference as the pulsating component.

4. The drive system according to claim 1, wherein
the magnetic flux current command determination process comprises:
a compensation direction determination process of determining a compensation direction of the magnetic flux current command, using the angle difference; and
a pulsation suppression control process of suppressing the pulsating component, using the pulsating component, and
the magnetic flux current command determination process determines the magnetic flux current command, on a basis of the pulsating component suppressed by the pulsation suppression control process and the compensation direction determined by the compensation direction determination process.

5. The drive system according to claim 4, wherein
the pulsation suppression control process comprises
at least one of: a phase adjustment process of adjusting a phase of the pulsating component and outputting the pulsating component whose phase has been adjusted; and a gain multiplication process of multiplying the pulsating component by a gain and outputting the pulsating component whose amplitude has been adjusted.

6. The drive system according to claim 5, wherein the phase adjustment process is a phase lag compensation process of delaying delay the phase of the pulsating component.

7. The drive system according to claim 5, wherein
the phase adjustment process is implemented by an approximate integrator formed by a first-order low-pass filter, and
the approximate integrator has a cutoff angular frequency set to lower than or equal to ⅓ an electromechanical spring resonance angular frequency.

8. The drive system according to claim 1, wherein
the pulsating component extraction process is implemented by:
a coordinate transformer to perform coordinate transformation of the first current or the second current into a d-q coordinate system; and
a high-pass filter to calculate the torque current pulsating component by removing a DC component contained in a q-axis current after the coordinate transformation.

9. The drive system according to claim 1, wherein
the pulsating component extraction process is implemented by:
a coordinate transformer to perform coordinate transformation of the first current or the second current into a d-q coordinate system; and
a bandpass filter to extract an electromechanical spring resonance angular frequency component contained in a q-axis current after the coordinate transformation to thereby calculate the torque current pulsating component having an electromechanical spring resonance angular frequency as a center frequency.

10. The drive system according to claim 9, wherein
the pulsating component extraction process
is further implemented by a resonance frequency measurer to measure the electromechanical spring resonance angular frequency, and
dynamically changes the center frequency of the bandpass filter.

11. The drive system according to claim 1, wherein
the pulsating component extraction process is implemented by:
an active power calculator to calculate the active power; and
a high-pass filter to calculate the active power pulsating component by removing a DC component contained in the active power.

12. The drive system according to claim 1, wherein
the pulsating component extraction process is implemented by:
an active power calculator to calculate the active power; and
a bandpass filter to extract an electromechanical spring resonance angular frequency component contained in the active power to thereby calculate the active power pulsating component having an electromechanical spring resonance angular frequency as a center frequency.

13. The drive system according to claim 12, wherein
the pulsating component extraction process
is further implemented by a resonance frequency measurer to measure the electromechanical spring resonance angular frequency, and
dynamically changes the center frequency of the bandpass filter.

14. A fluid utilization apparatus comprising the drive system according to claim 1.

15. An air conditioner comprising the fluid utilization apparatus according to claim 14.

* * * * *